United States Patent
Touzov

(10) Patent No.: US 7,057,370 B2
(45) Date of Patent: Jun. 6, 2006

(54) ULTRA-FAST PRECISION MOTOR WITH X, Y AND THETA MOTION AND ULTRA-FAST OPTICAL DECODING AND ABSOLUTE POSITION DETECTOR

(76) Inventor: Igor Victorovich Touzov, 311 Castle Hayne Dr., Cary, NC (US) 27519

( * ) Notice: Subject to any disclaimer, the term of this patent is extended or adjusted under 35 U.S.C. 154(b) by 42 days.

(21) Appl. No.: 10/710,121

(22) Filed: Jun. 20, 2004

(65) Prior Publication Data

US 2005/0001579 A1    Jan. 6, 2005

Related U.S. Application Data

(60) Provisional application No. 60/481,005, filed on Jun. 21, 2003.

(51) Int. Cl.
*H02K 41/02*    (2006.01)

(52) U.S. Cl. .............. 318/687; 318/649; 318/135; 310/12

(58) Field of Classification Search ........... 318/116, 318/135, 648, 649, 686, 687; 310/12–14; 74/471 XY
See application file for complete search history.

(56) References Cited

U.S. PATENT DOCUMENTS

| | | | |
|---|---|---|---|
| 3,761,747 A * | 9/1973 | Allaigre ................ 310/13 |
| 3,852,626 A * | 12/1974 | Davis ................... 310/13 |
| 4,216,397 A * | 8/1980 | Popov et al. ........... 310/13 |
| 4,239,997 A * | 12/1980 | Popov et al. ........... 310/13 |
| 4,241,268 A * | 12/1980 | Popov et al. ........... 310/13 |
| 4,514,674 A | 4/1985 | Hollis, Jr. et al. |
| 4,695,777 A * | 9/1987 | Asano .................. 318/130 |
| 5,153,494 A | 10/1992 | Hollis, Jr. |
| 6,130,517 A * | 10/2000 | Yuan et al. ............ 318/640 |
| 6,144,118 A | 11/2000 | Cahill et al. |
| 6,271,606 B1 * | 8/2001 | Hazelton ............... 310/12 |
| 6,353,271 B1 | 3/2002 | Williams |
| 6,405,659 B1 | 6/2002 | Hazelton |
| 6,437,864 B1 | 8/2002 | Watanabe et al. |
| 6,650,079 B1 * | 11/2003 | Binnard ................ 318/649 |
| 6,703,806 B1 * | 3/2004 | Joong et al. ........... 318/649 |
| 6,770,988 B1 * | 8/2004 | Denne .................. 310/12 |
| 6,879,127 B1 * | 4/2005 | Gery ................... 318/649 |

* cited by examiner

*Primary Examiner*—Bentsu Ro

(57) ABSTRACT

A high-speed and extremely large range positioning apparatus capable of producing motions in multiple dimensions with high precision and very high reliability. An ultra fast absolute position sensor providing instantaneous position readings with sub nanometer precision on full range of relative positions. A set of optical encoding schemas providing high encoding density and extremely fast decoding regardless of their planar positions. A flexible reshape-able motor with multiple degrees of motions

27 Claims, 33 Drawing Sheets

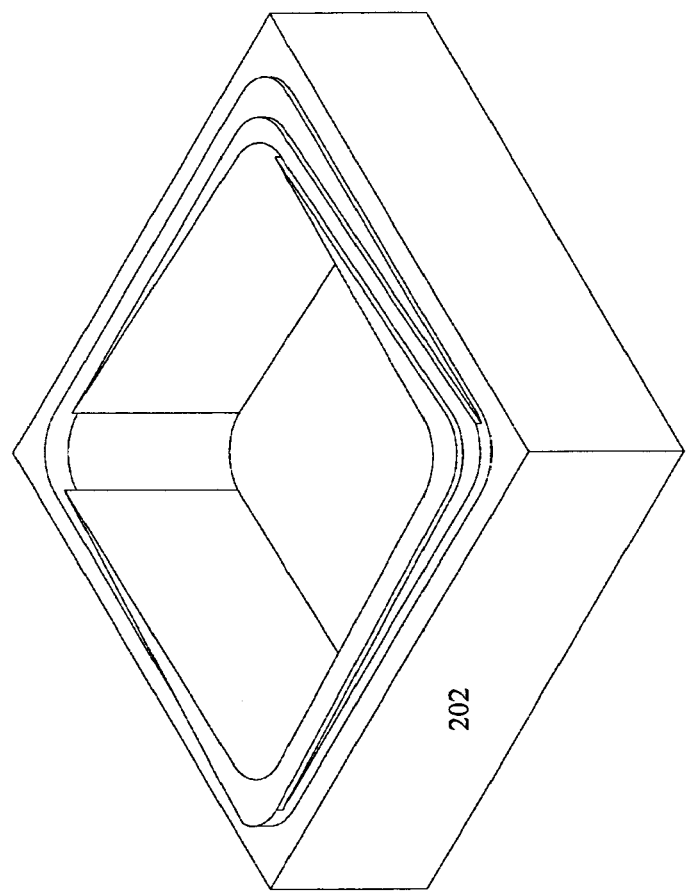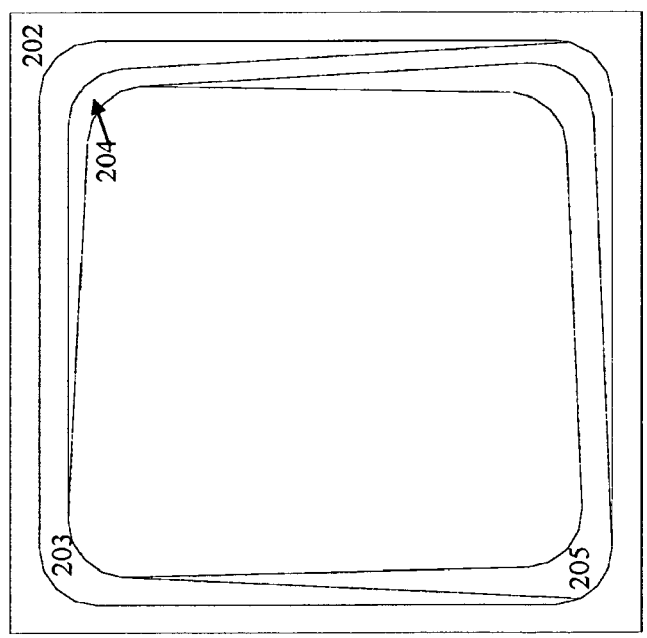
Fig. 7

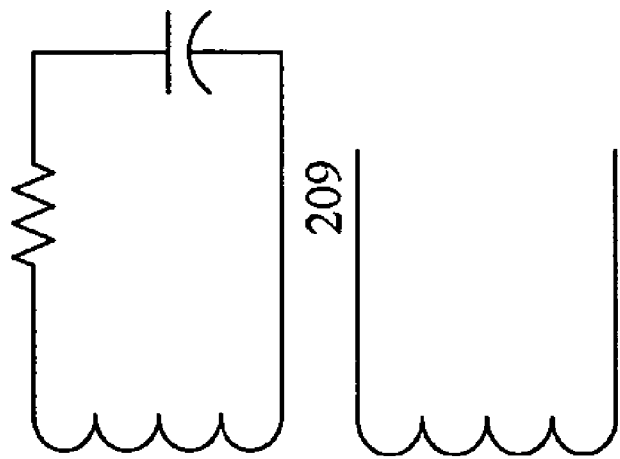
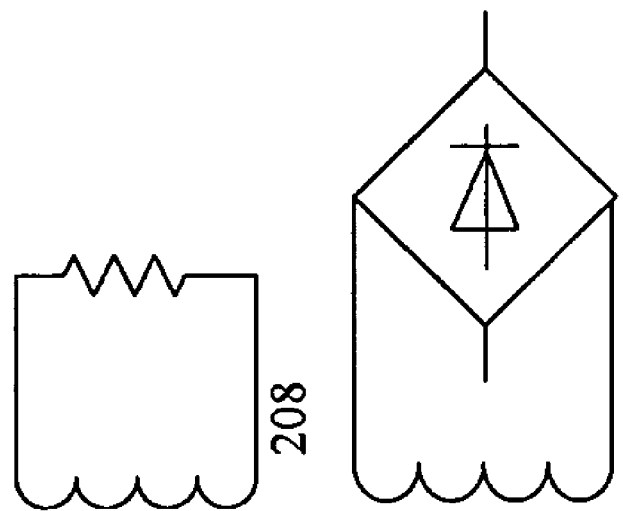
Fig. 12

In assumption that $I_{ms} \ll I_m$ and $I_{ms} \ll I_s$ $Z_m = R + i\omega L_m = Ae^{i\varphi}$, where $A = \sqrt{R^2 + \omega^2 L_m^2}$ and $\operatorname{tg}(\varphi) = \omega L_m / R$ $E_m = (L_{ms_i} E_i + L_{ms_{i+1}} E_{i+1}) / L_s$, $I_m = \dfrac{e^{-i\varphi}}{L_s A}(L_{ms_i} E_i + L_{ms_{i+1}} E_{i+1})$ Magnetic field created by coils $L_s$ in location of coil $L_m$ $\vec{B}_i = \vec{f}_i(x,y,z) I_i L_s$, $E_i = I_i L_s \omega e^{i\pi/2}$ Lateral force acting on the coil $L_m$ in direction of axis X $F_X = n I_m S \dfrac{dB_{Zi}}{dX} = \dfrac{nS\omega e^{i(\pi/2 - \varphi)}}{AL_s}(L_{ms_i} I_i L_s + L_{ms_{i+1}} I_{i+1} L_s) \dfrac{d(f_{zi} I_i L_s + f_{zi+1} I_{i+1} L_s)}{dX}$ when $|I_i| = |I_{i+1}|$ $F_X = \dfrac{nS\omega L_s |I_i|^2}{2A}\Bigg(L_{ms_i}\dfrac{df_{zi+1}}{dX}(\sin(\varphi) - \sin(2\omega t - \varphi)) +$ $L_{ms_{i+1}}\dfrac{df_{zi}}{dX}(\sin(\varphi) - \sin(2(\omega t + \alpha) - \varphi)) +$ $L_{ms_{i+1}}\dfrac{df_{zi}}{dX}(\sin(\varphi - \alpha) - \sin(2\omega t + \alpha - \varphi)) +$ $L_{ms_i}\dfrac{df_{zi+1}}{dX}(\sin(\varphi + \alpha) - \sin(2\omega t + \alpha - \varphi))\Bigg)$ where $\alpha$ is a phase shift between $E_i$ and $E_{i+1}$

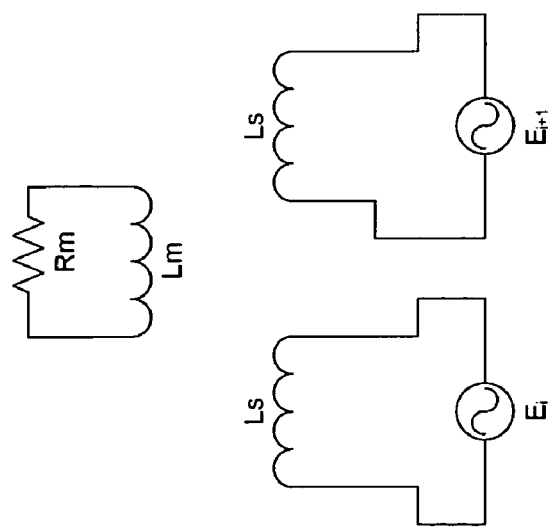

Fig. 13

In assumption that $\dfrac{df_{zi}}{dX} = -\dfrac{df_{zi+1}}{dX}$ and $L_{ms_{i+1}} = L_{ms_i}$ Lateral force acting on the coil $L_m$ in direction of axis X $$F_X = \dfrac{nS\omega L_s L_{ms_i} |I_i|^2 \left|\dfrac{df_{zi}}{dX}\right|}{A}(\cos(\varphi)\sin(\alpha) - \sin(\alpha)\cos(2\omega t + \alpha - \varphi))$$

Avarage over period $$\overline{F}_X = \dfrac{nS\omega L_s L_{ms_i} |I_i|^2 \cos(\varphi)\sin(\alpha) \left|\dfrac{df_{zi}}{dX}\right|}{A}$$

Fig. 14

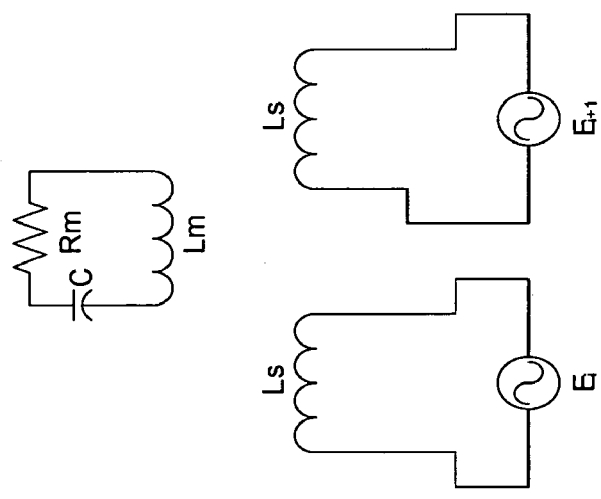

In assumption that $L_{ms} \ll L_m$ and $L_{ms} \ll L_s$ $Z_m = R + i\left(\omega L_m - \dfrac{1}{\omega C}\right) = Ae^{i\varphi}$, where $A = \dfrac{L_m}{\omega}\sqrt{4\omega^2\gamma^2 + (\omega_0^2 - \omega^2)^2}$, $\text{tg}(\varphi) = 2\omega\gamma \Big/ (\omega_0^2 - \omega^2)$, $\dfrac{R}{L_m} = 2\gamma$ and $\dfrac{1}{L_m C} = \omega_0^2$ Lateral force acting on the coil $L_m$ in direction of axis X when it is centered between array coils $$\overline{F}_X = \dfrac{nS\omega^2 L_s L_{ms} |I_i|^2 \cos(\varphi)\sin(\alpha)}{L_m\sqrt{4\omega^2\gamma^2 + (\omega_0^2 - \omega^2)^2}} \dfrac{df_{zi}}{dX}$$

Fig. 15

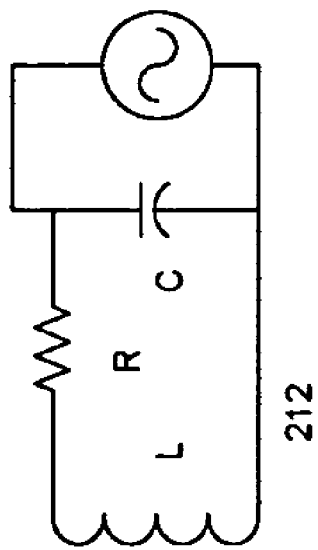
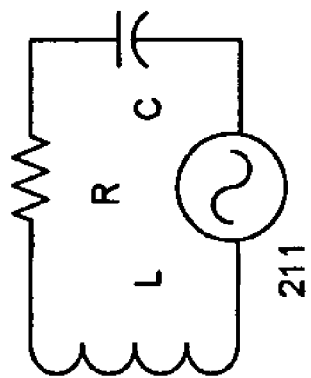
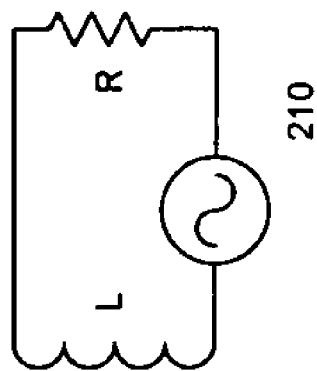
Fig. 16

In periodic structure magnetic field is described by $$B = |B(z)| \cos\left(\omega_x(t - x/c_x)\right) \cos\left(\omega_y(t - y/c_y)\right)$$

Current through mobile coil $$I = |I|\cos(\omega t + \varphi),$$

where $\varphi$ is phase shift with respect to average external field through the coil When $\omega = \omega_x$, and $\omega_y = 0$ average drag force acting on the coil $$\overline{F} = |B(z)||I|y_{coil} \sin\left(\omega_x x_{coil}/2c_x\right) \sin(\varphi)$$

Fig. 17

Propulsion force $F = BIy_0 N$, where $y_0$ is coil crosssection size

Mass of the stage $M = \dfrac{4N\rho_m h y_0^2}{k} + \dfrac{4N\rho_w h y_0^2}{b} + M_{load}$, where $k$ is relative thikness of metallization and $b$ is relative thikness of stage walls Power losses $P = 1/2 I^2 N R_0$, where $R_0$ is resistance of coil metallization $R_0 = \dfrac{4\eta k}{h}$ $A = F/M = \dfrac{B\sqrt{W}}{\sqrt{2\eta k h}\left(4\rho_m/k + 4\rho_w/b + M_{load}/V\right)}$, where $W$ is power density P/S

Fig. 18

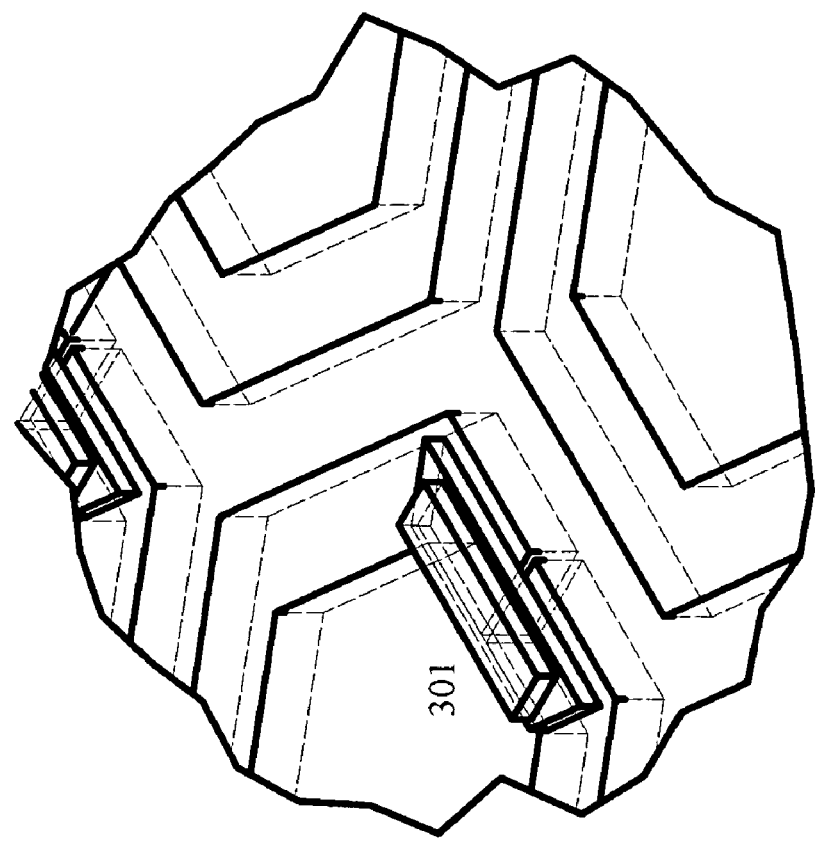
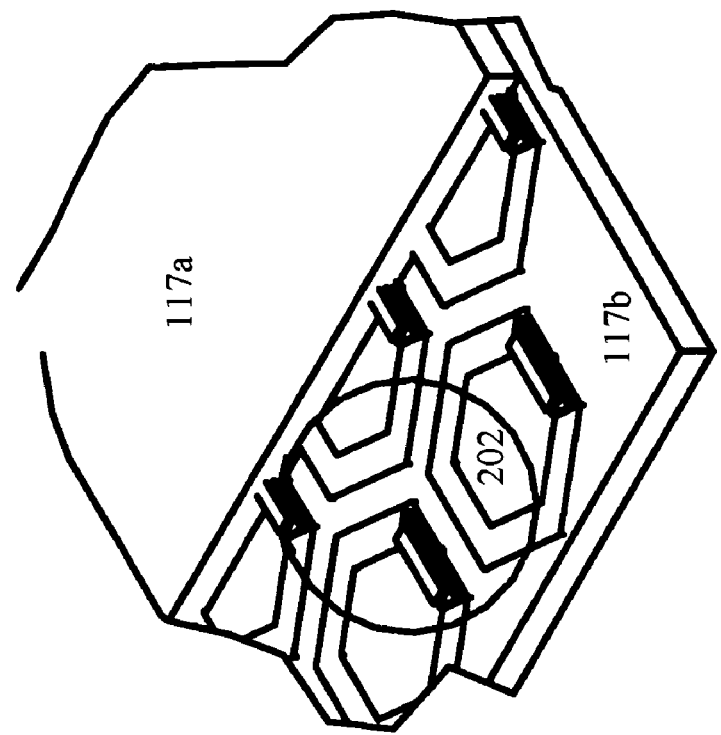
Fig. 19

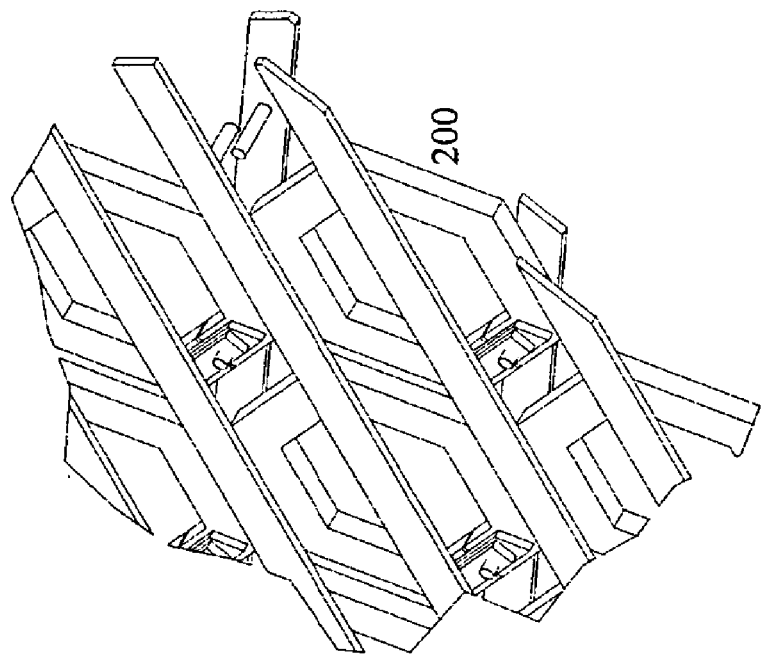
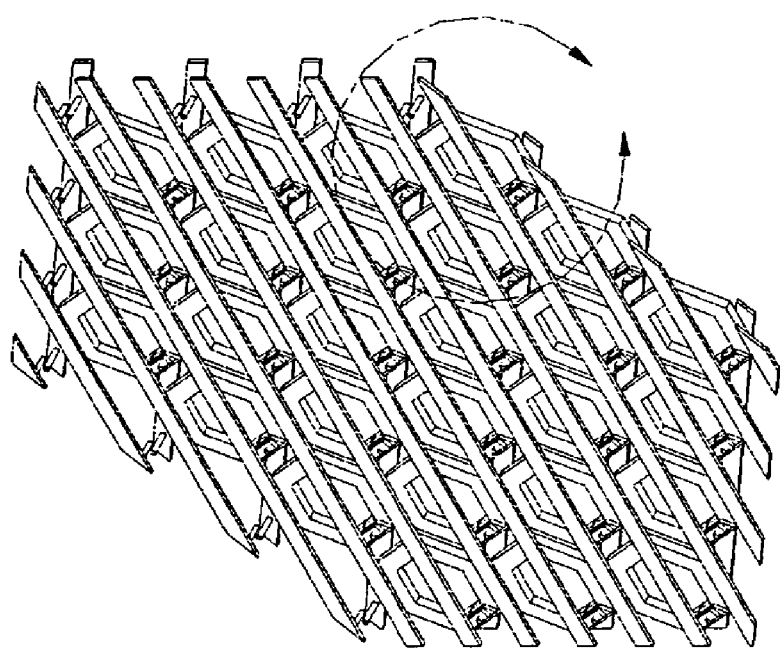
Fig. 22

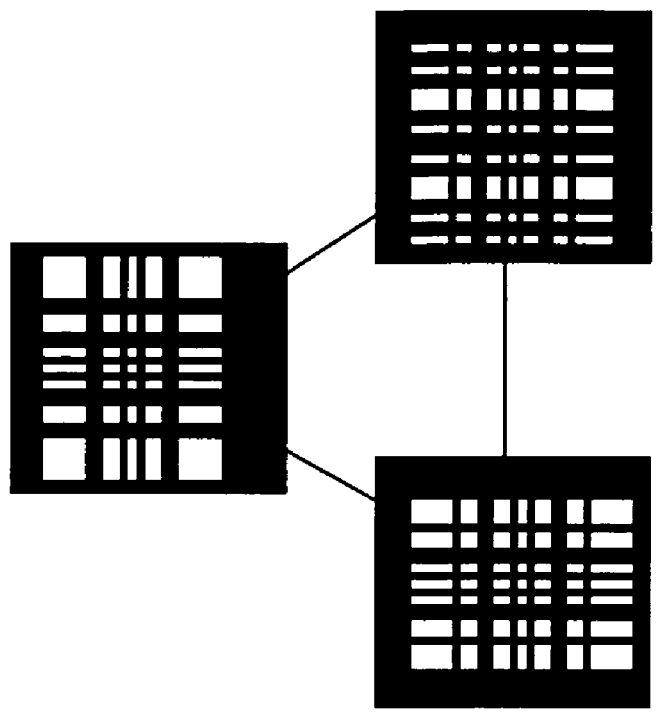
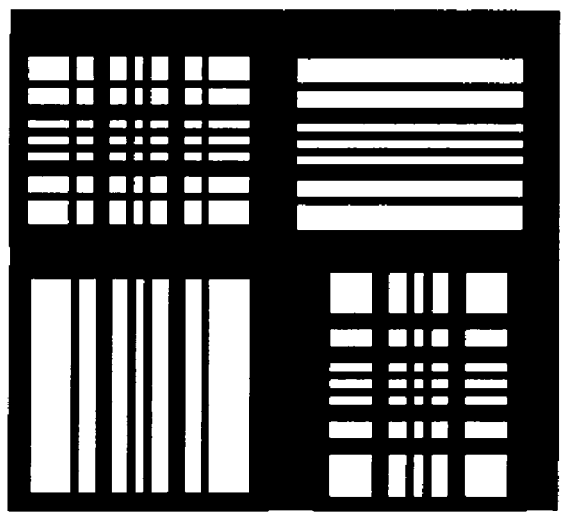
Fig. 25

ULTRA-FAST PRECISION MOTOR WITH X, Y AND THETA MOTION AND ULTRA-FAST OPTICAL DECODING AND ABSOLUTE POSITION DETECTOR

CROSS REFERENCE TO RELATED APPLICATIONS

This application is a regular application of provisional Patent Application No. 60/481,005, filed Jun. 21, 2003 which is hereby incorporated by reference in its entirety for all purposes

BACKGROUND OF INVENTION

This invention relates to high-speed positioning apparatuses useful for nano- and micro-scale technological applications, such as semiconductor wafer processing, chemical substance deposition, and experimentation with bio-organic materials, scanning microscopy, or other applications which include macro scale transport equipment and positioning devices.

Nano-technological applications often require high precision positioning of substrate combined with large range of motion. Time between elementary processing steps always needs to be minimal to accommodate low contamination level, small feature sizes and process throughput.

Typical example of nano-technological process is micro-contact deposition of chemicals using micro-stamps and cantilever type devices. Electron-beam type devices that operate on principle of scanning tunneling microscope is another typical example.

Existing positioning equipment usually use combinations of slow large range positioning mechanism with relatively fast micro-range stage. Cahill, Hunter, U.S. Pat. No. 6,144,118, describe an apparatus capable of moving in X, Y, and yaw in limited range with moderate speed. It uses separate mechanical stage for slow large range motion. Apparatus uses permanent magnets as a part of movable part of the stage. Such design limits range of achievable accelerations for the stage due too high mass of the magnets and their limited magnetic field.

Hollings, U.S. Pat. No. 5,153,494 describes an apparatus capable of moving with extreme accelerations in X, Y, and yaw in limited range. The apparatus uses electrically powered conductive coils as a part of movable part of the stage. Such design requires electrical wires to be attached to the movable part, which restricts reliability of the apparatus. Repetitive motions of the stage cause the wires to break. It is also limiting supply currents to the stage, because high current require thicker wires with lower flexibility.

Trumper, U.S. Pat. No. 5,196,745, describes an apparatus capable of motion in 200 to 300 mm range in one or two degrees of freedom. Linear motions of the stage provided by permanent magnets attached to the movable part. Such design carries the same restrictions on maximum achievable acceleration.

SUMMARY OF INVENTION

In one aspect the invention features an object positioning apparatus having single stage configured to support the object and move it by means of plurality of drive motors that provide forces directly to the stage. The drive forces enable motions in at least tree degrees of freedom. A plurality of gas bearings and, in some embodiments, vacuum suction elements constrains motion of the stage in all remaining degrees of freedom. A controller connected to the apparatus governs operation of all its components. Drive motors exclude permanent magnets. Each drive motor has array of base coils, and coplanar high-speed mobile layer. In some embodiments this layer have perforations or made of overlapping conductors. This high-speed layer does not have any flexible wires that provide current to power motor operation. The array of base coils has plurality of gas or liquid bearing that provides motion of the array with three degrees of freedom with respect to the base of the apparatus. Driving currents are supplied to the array through plurality of flexible wires or in some embodiments by means of high frequency power transformers.

Mobility of both high-speed stage and base coil array provides complete cancellation for motion momentum, and small weight ratio of high-speed stage and the coil array guarantees small motion range of the base coils.

Invention also includes mechanical breaks that use friction of movable parts to achieve peak deceleration of the stage. These breaks also allow immobilization of the stage. The brakes consist of plurality of braking pads and drive that brings the pads in contact with the stage. The drive uses electric coil located in the magnetic field of electrical or permanent magnet. In some embodiments the drive uses piezo material to move breaking pads.

The assembly of moving parts in some embodiments uses top and bottom arrangement of stationary elements, while other orientations and arrangements also considered, and include vertical stack assembly, single side etc. Stationary drive coils and brakes components are positioned below and or above the movable stage. The stage design has only monolithic elements which makes it very stiff, passive elements of the coil layer form an integral part of the stage. As a result the stage has very low weight and high stiffness which benefits to high precision of position control and extreme accelerations.

The design of the motors and the stage has no deformable elements what provides high degree of reliability for long-term continuous operation.

In other aspect the invention features integral thermal management solution for the stage. This solution contains heat-flux sensors, heat transfer elements, in some embodiments it uses passive conductors, or heat pipes or actively pumped mobile phase, and thermal management controller.

Thermal management controller has data link to stage motion controller and computes thermal management solution based on current deviations of thermal distribution as well as data on following stage motion sequences.

In other aspect the invention features high precision fast position sensor capable of monitoring real-time position of high-speed stage with respect to the base of the apparatus.

In other aspect the invention features well defined set of atomic operations for the stage controller. Each atomic operation has predefined set of parameters. Collection of these operations composes interface and or language for communication with the apparatus. Language also contains version information that allows successful negotiation on allowed set of commands between various generations of controller software.

In other aspect the invention features, in some embodiments, asymmetric drive motor that have maximum acceleration in one dimension and lower accelerations in other dimensions. Most production sequence can be optimized to motion in preferred dimension, which allows facilitate higher overall performance with asymmetric drive motor design versus symmetric one.

BRIEF DESCRIPTION OF DRAWINGS

FIG. 7 shows method of construction of grid with cells.

FIG. 12 shows electrical schemas of individual cell in the grid.

FIG. 13 shows principle of operation of the motor.

FIG. 14 shows estimation of average propulsion force.

FIG. 15 shows simplified calculations for two coil array.

FIG. 16 shows stage coil circuits may have designs.

FIG. 17 shows simplified calculations for propulsion force in periodic field.

FIG. 18 shows formula for quick estimation of achievable acceleration of the stage.

FIG. 19 shows example of design for coils of the mobile stage.

FIG. 22 shows electrical elements of the base drive assembly.

FIG. 25 shows example of spatial encoding of the grating.

DETAILED DESCRIPTION

The basic idea of the invention is a combination of extreme durability and ultra fast positioning. Yet another revolutionary result is lateral mobility over large macroscopic distances with sub-nanometer precision which is achievable over full motion range and completely unconstrained by either extreme speeds or accelerations of the movements. Invention consists of two major parts which are: positioning stage with Y, Y and rotational degrees of freedom; and absolute position detector that uses spatial encoding and provides guaranteed precision in lateral position detection.

POSITIONING STAGE

This embodiment focuses on detailed description of mechanical structure of the positioning stage. Overview of the apparatus is shown on FIG. 1. Components of the stage are supported by the base 101 which provides an interface with flexible wiring and tubing 102*a–b* for mobile base 104, 107. It also holds detector head 103 of the absolute position detector which in some cases may be substituted or combined with other types of detectors for lateral and or height and or tilt detectors. Flexible wiring may be substituted by high frequency transformers transmitting power and control signals between 101 and 104, while preserving free motion of 104.

Mobile base frame 104, by design, has maximum mass which may be achieved by embedding inserts of heavy metals into its construction. Top surface of the base 101 and bottom surface of 104 are lapped to provide minimum vertical distortions during motions. Mobile base 104 slides along the surface of the base 101 using air or liquid bearing. In case of air bearing the design may employ artificial magnetic holding of the mobile base. This magnetic holding used to increase stiffness of the air bearing in applications that are sensitive to external vibrations or performed in locations with poor vibroisolation. This bearing may also employ suction ports to achieve stiffness increase.

Figure 1:
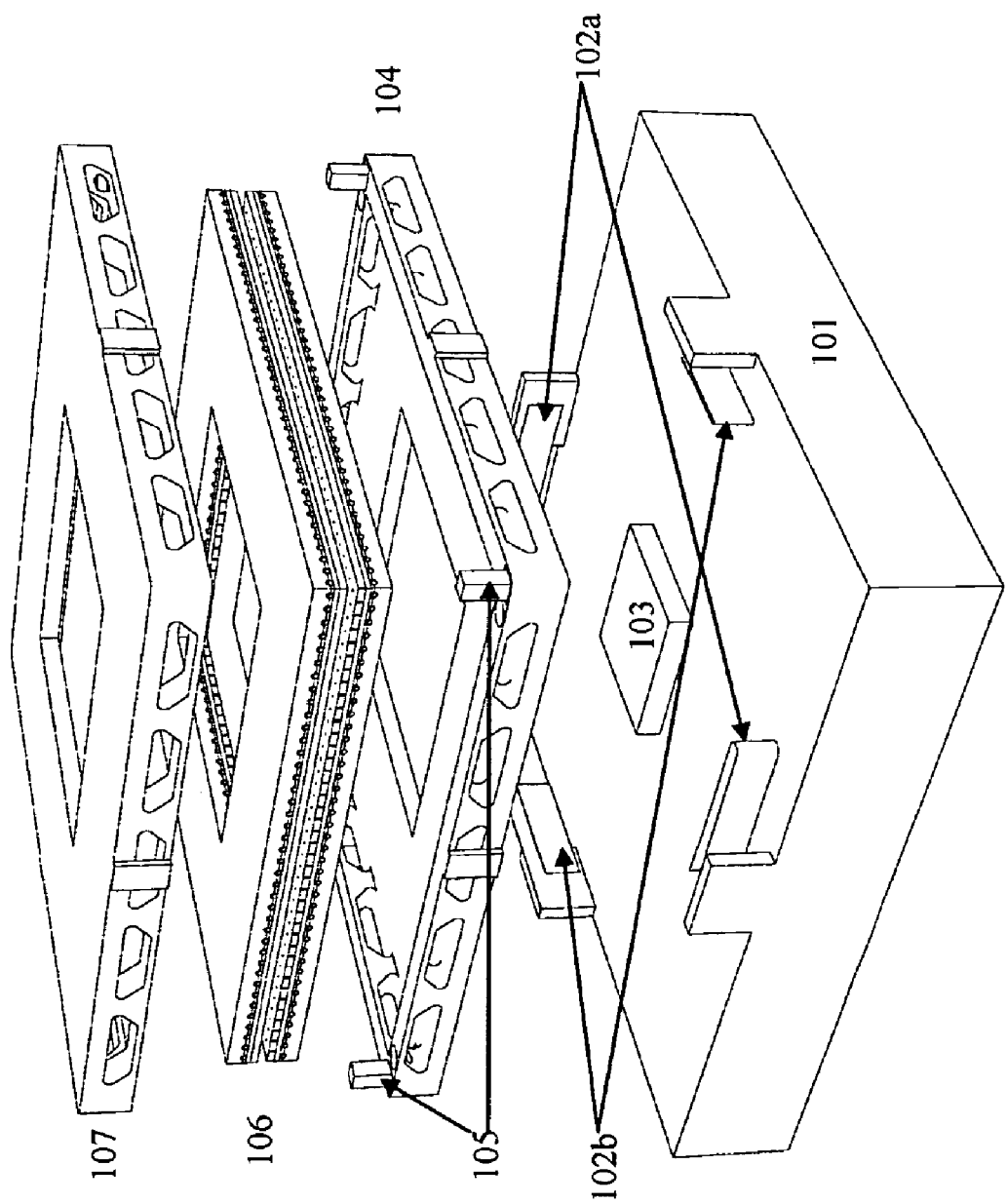
FIG. 1 shows exploit view of planar positioning stage with shielded design.

Electromagnetic motor 106 is mounted on the frame 104. The motor can be implemented in open and shielded design. Shielded design shields emission of high frequency electromagnetic field. It has base and top assemblies. Unshielded design as only base assembly and provides larger work area as well as higher accelerations. FIG. 1 shows an example of the shielded design. Base assembly of the motor mounted on the frame 104. Top assembly of the motor mounted on the holding frame 107.

Electromagnetic and bearing pressure from the motor causes uneven repulsion between frames 104 and 107 as a function of current lateral position of the mobile stage 109. Frames 107 and 104 are leveled by motors 105. These motors may use solenoids, piezo drives, SAW motors, thermal expansion rods, or any other single dimension positioning devices. In some cases, design may omit 105 motors and use fixed mount of the frames 104 and 107, which can be achieved by placing adjustment screws or other hardware.

Figure 2:
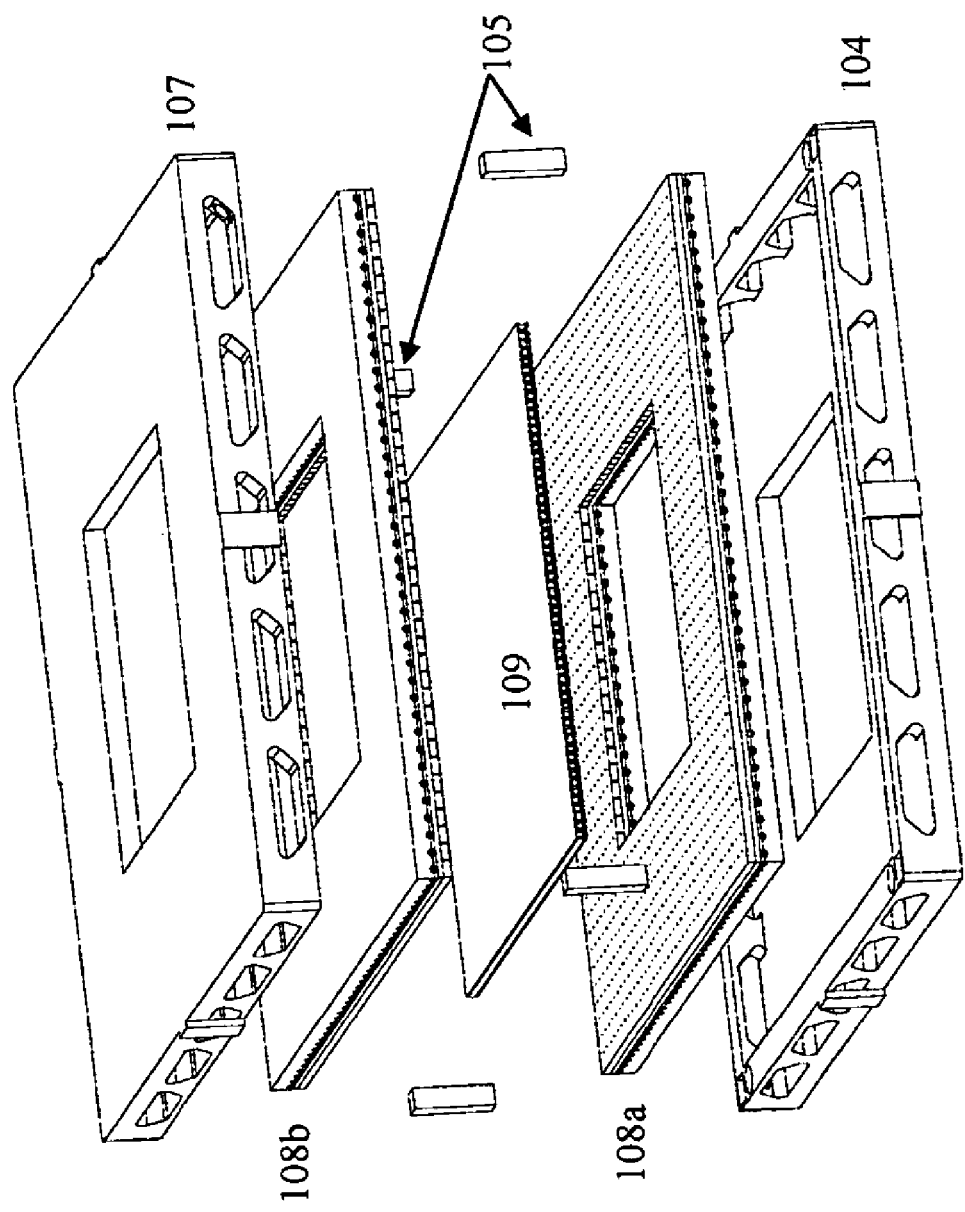
FIG. 2 shows exploit view of mobile base.
Figure 3:
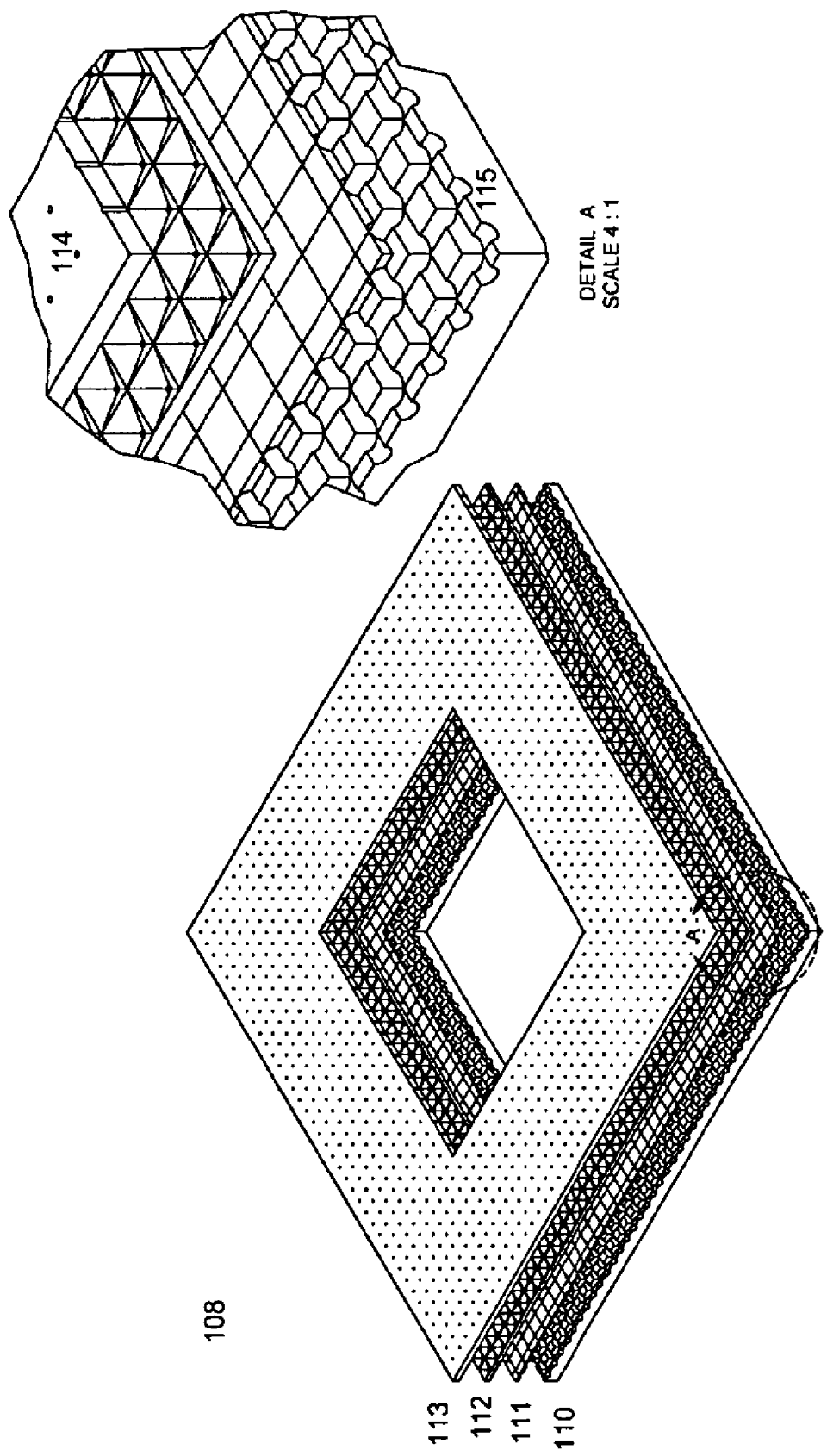
FIG. 3 shows construction of the magnetic core with orthogonal layout.

Shielded electromagnetic motor 106 is shown in details on FIG. 2. It consists of top 108*b* and bottom 108*a* lateral magnetic drives and mobile stage 109. Constructions of 108*a* and 108*b* are almost identical, yet in some designs one of these assemblies can be replaced with passive magnetic shielding, that as well may embed thermal management apparatus. Magnetic drive consists of coils array and optional magnetic core. FIG. 3 shows construction of the magnetic core. Primary functions of the core are formation of magnetic field with maximum lateral gradients of normal component $dH_z/dX$ and $dH_z/dY$, and reduction of mutual induction between adjacent coils. Magnetic core may consist of multiple elements. As an example FIG. 3 show the core constructed of base 110 and top 111 segments. Function of the 111 segment in combination with adapter 112 is to create desired distribution of magnetic field in the volume of the mobile stage 109. Spacer 113 covers this assembly. Function of the spacer is to provide uniformly smooth flat surface with high durability and flatness. This assembly has air bearing 114 to interface with stage 109. In some embodiments the air bearing also functions as a part of active thermal management apparatus. Coils wiring placed in channels 115. Their shape and layout may vary in different designs. The most efficient layouts include linear, orthogonal and honey comb placements of the coil wires.

Figure 11:
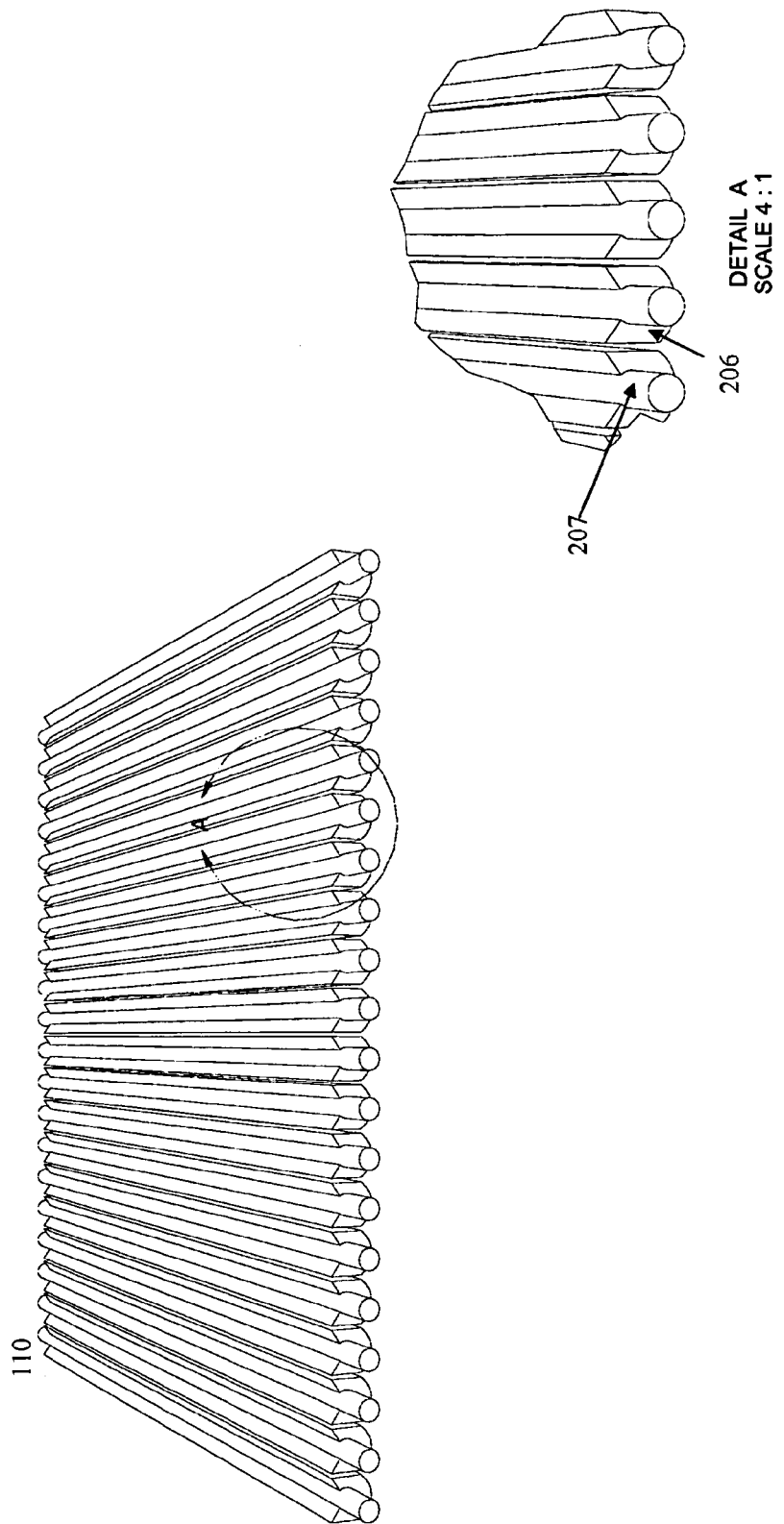
FIG. 11 shows construction of base magnetic shield which implements the linear layout.

Linear layout has a unidirectional array of coils that can move the stage in single dimension. This layout uses assembly 108a and 108b with relative orientation close to orthogonal. Coils of 108a cause stage propulsion in X direction while coils of 108b cause propulsion in Y direction. FIG. 11 shows construction of base magnetic shield 110 which implements the linear layout. Ferromagnetic core is formed by collection of profiles 206. Coil wires 207 are placed inside the profile and may be hollow inside to allow flow of coolant from thermal management apparatus.

Figure 6:
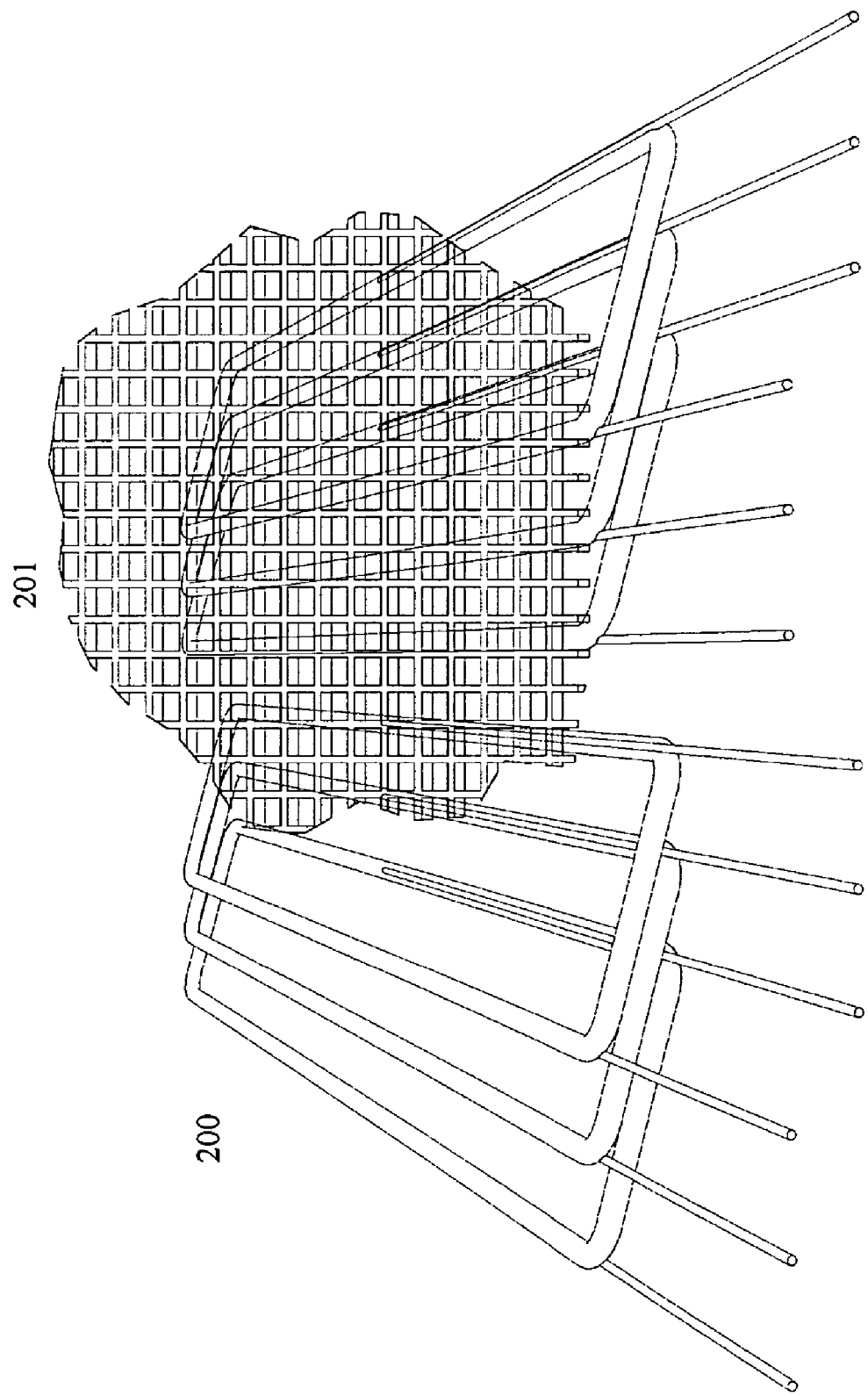
FIG. 6 shows example of statically formed coils and coils array of the mobile stage.
Figure 8:
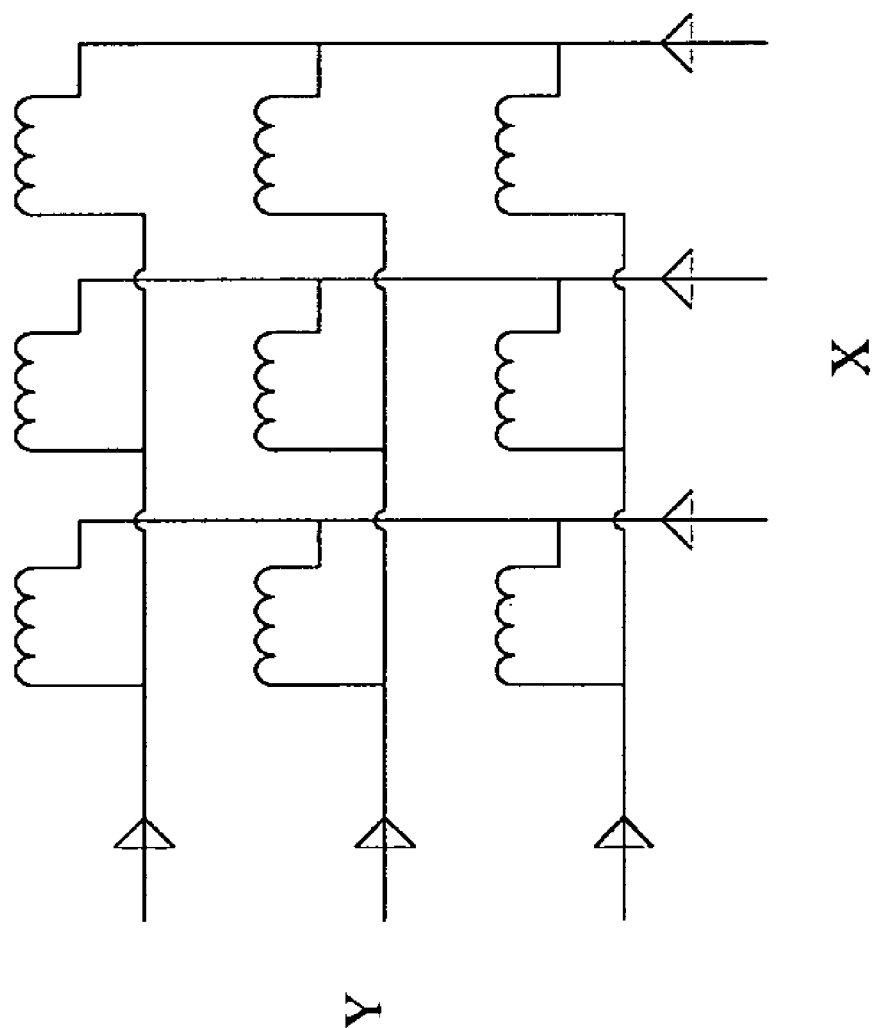
FIG. 8 shows schematic electrical diagram of two-dimensional array of isolated coils.
Figure 9:
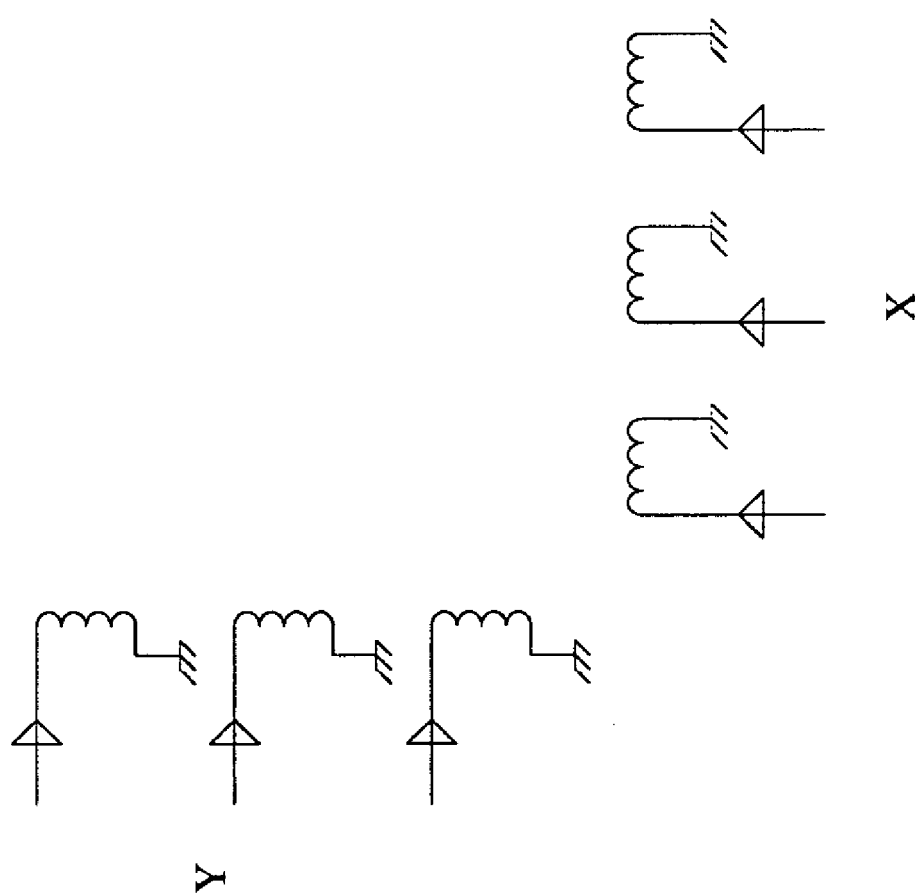
FIG. 9–10 shows schematic electrical diagram of two-dimensional array of standard wires.
Figure 10:
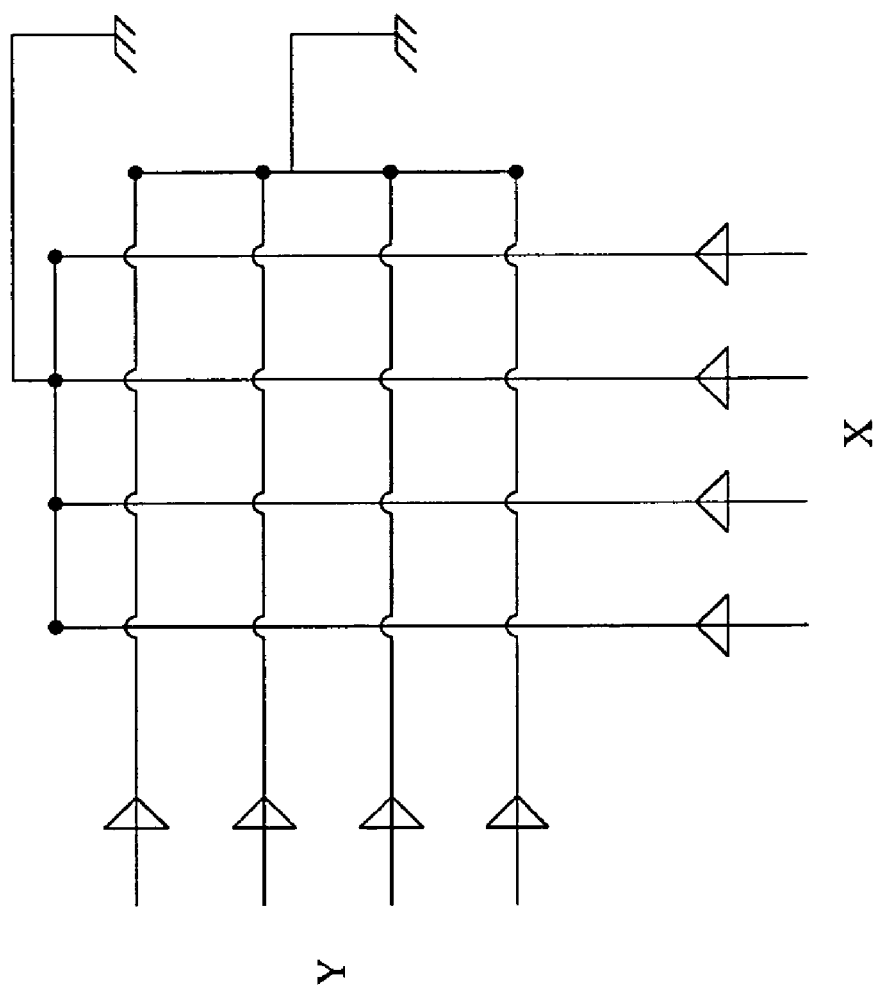

Orthogonal layout is shown on FIG. 3. Each volume 115 contains isolated coil wiring. Coils can be made of standard round wires as well as be manufactured as complete array of isolated coils using photolithography. Schematic electrical diagram of two-dimensional array of isolated coils is shown on FIG. 8. Schematic electrical diagram of two-dimensional array of standard wires is shown on FIG. 9 and FIG. 10. Each coil on FIG. 9 may be virtually formed at runtime. In such case it is formed by forward and return wires of same orientation. FIG. 6 shows an example of statically formed coils 200 and coils array 201 of the mobile stage. Similar designs are equally applicable to honeycomb layout.

Figure 4:
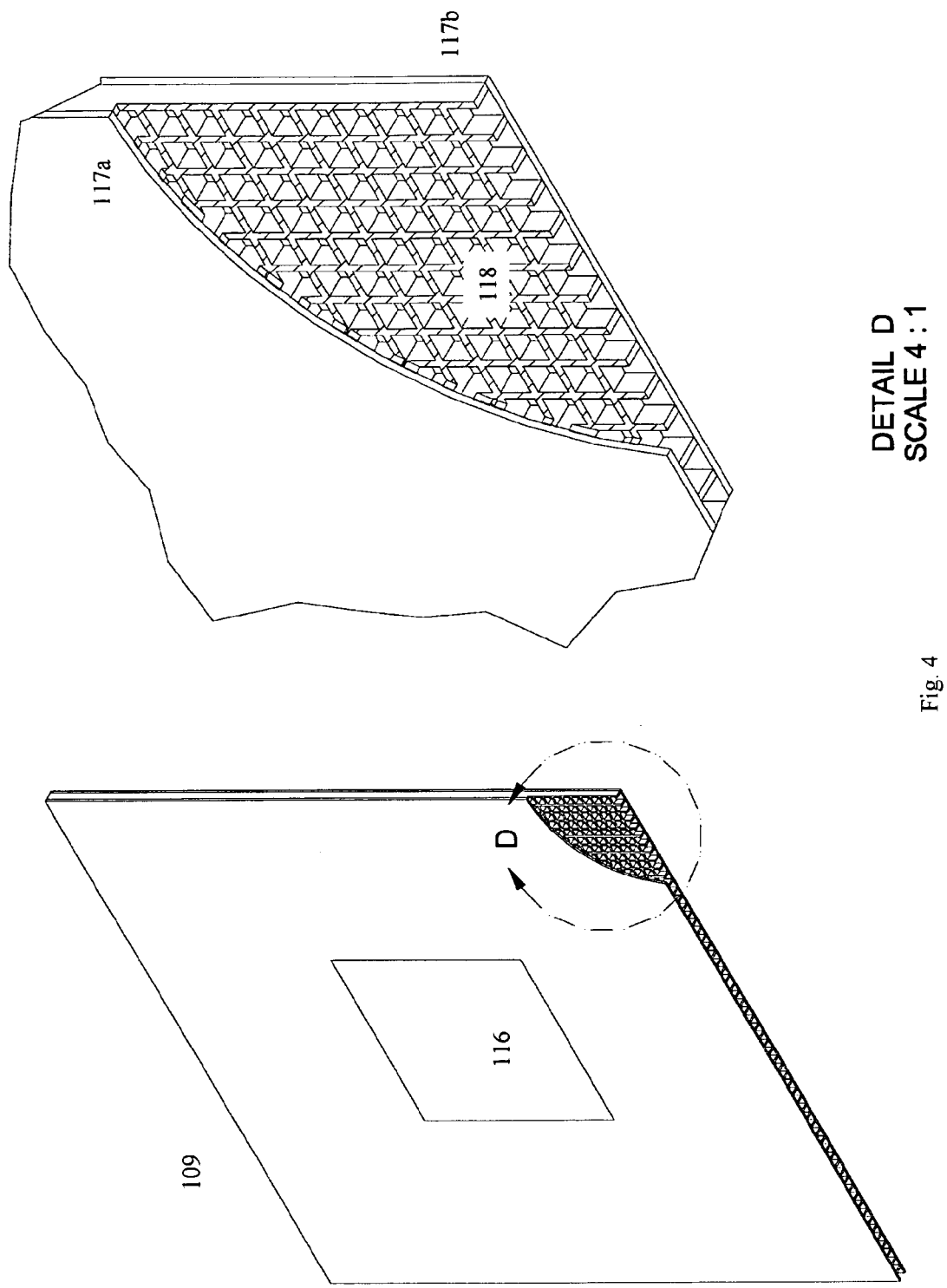
FIG. 4 shows construction of the mobile stage.

Construction of the mobile stage 109 is shown in details on FIG. 4. The mobile stage consists of coil grid 118, lower and top guard layers 117a and 117b and two-dimensionally encoded grating 116. In unshielded design of the motor size of the grating 116 should match size of the stage 109. Important aspects of the stage construction are high mechanical strength and good thermal conductivity. Individual cells of the grid 118 can have various shapes including triangular, rectangular, honeycomb, and circular, as well as the size of the cells may vary from cell to cell and may form a complex patterns.

Electrical schemas of individual cell in the grid are shown on FIG. 12. There are two primary designs 208 and 209 important for motor operations as well as other auxiliary designs useful for control and utility goals. Construction of cell with design 208 can be achieved by deposition of conductive layer on all surfaces of the grid. Advantage of such design is its ability to maintain translation speed with very high precision. Disadvantage of this design is extensive heat dissipation during acceleration and deceleration.

Design 209 does not have mentioned disadvantage and is capable providing steady acceleration cycles with minimum power dissipation. Method of construction of grid with cells of such design is shown on FIG. 7. Beryllium ceramics could be selected as a material of the grid 118. Many other ceramics and fiber reinforced polymer composites can be used as the material for the grid as well. The grid is coated with Al, or Cu or Au or any other conductive material with low resistance. Coating process should create conductive layer 203 on approximately ¾ of perimeter of the cell 202. This can be easily achieved by directional vacuum deposition of the named materials. Then process repeats creating thing film 204 of insulation material using deposition under different angle. Process repeats again with deposition of conductive layer 205 on top of partially exposed conductive layer 203 and the insulation layer 204. Resulting structure has electrical characteristics of the circuit design 209.

FIG. 13 explains principle of operation of the motor that uses design 208. The drawing shows only simplified calculations which are not precise for case of large arrays. Array of coils is powered up with alternative currents shifted in phase between adjacent coils. Optimal phase shift is 50–90 degrees and depends on number of coils and their geometry. As an example, for array of two stationary coils and one mobile coil located at the center of the array result of calculations shown on FIG. 14, which indicates that optimal phase shift is 90.

FIG. 15 shows simplified calculations for two coil array that uses design 209. Equations show that propulsion force significantly increases at high frequencies close to resonance frequency of the mobile coil.

Both mobile stage coil array and mobile base coil arrays can be implemented as two dimensional grids, photolithography process described above is acceptable method for this. Geometries of these arrays are selected to have electrical impedances of stage coils and base coils at driving frequency close by value. Stage coil circuits may have design similar to 210, 211 or 212 of FIG. 16, and be connected in parallel with other coils using layout similar to one shown on FIG. 8.

FIG. 18 shows formula for quick estimation of achievable acceleration of the stage. Example: payload is 150 mm Si wafer with mass 42 g. Stage size is 300×300×1 mm. Stage material is beryllium oxide with density 2.85 g/cc. Metallization material is aluminum. Mobile stage created as squire grid of 50×50 cells with dimension 6×6 mm and height 1 mm. Wall thickness is 1 mm. Metallization thickness is 1000 um. Power losses in stage 90 W. Magnetic field intensity is 500 mT. Achieved acceleration is 24 g. Inductance of single coil is $1.7 \cdot 10^{-6}$ H and resistance is $5 \cdot 10^{-4}$ Ohm. Resonance frequency of cell is 0.5 MHz. Mobile base created as square grid of 225×225 cells with dimension 2×2 mm and height of each half 1 mm. Metallization material is copper with thickness 300 um. Resistance is $2 \cdot 10^{-4}$ Ohm. Gross dimensions: 450×450 mm. Inductance of single coil is $5 \cdot 10^{-7}$ H. Current through each base coil is 4 A. Total heat dissipation in base is 90 W. Drive amplitude of driver circuitry is 6 V.

Another example of design for coils of the mobile stage 109 is shown on FIG. 19. The coils 202 are manufactured as flat surface printed circuits. According to selected electrical design each coil may contain additional electronic components including but not limited to capacitor 301, resistor, rectifiers, filters, resonators. These circuits and elements are enclosed in protective envelope. The method of the enclosure include, but not limited to lamination between two polymer films, bonding to bottom and top ceramic, glass or composite plates, etc. Geometry of the coils can vary through the stage, as well as their electrical circuits design. As an example some coils can be used as a transformer coils to supply electrical power or signals to the stage's components.

Figure 20:
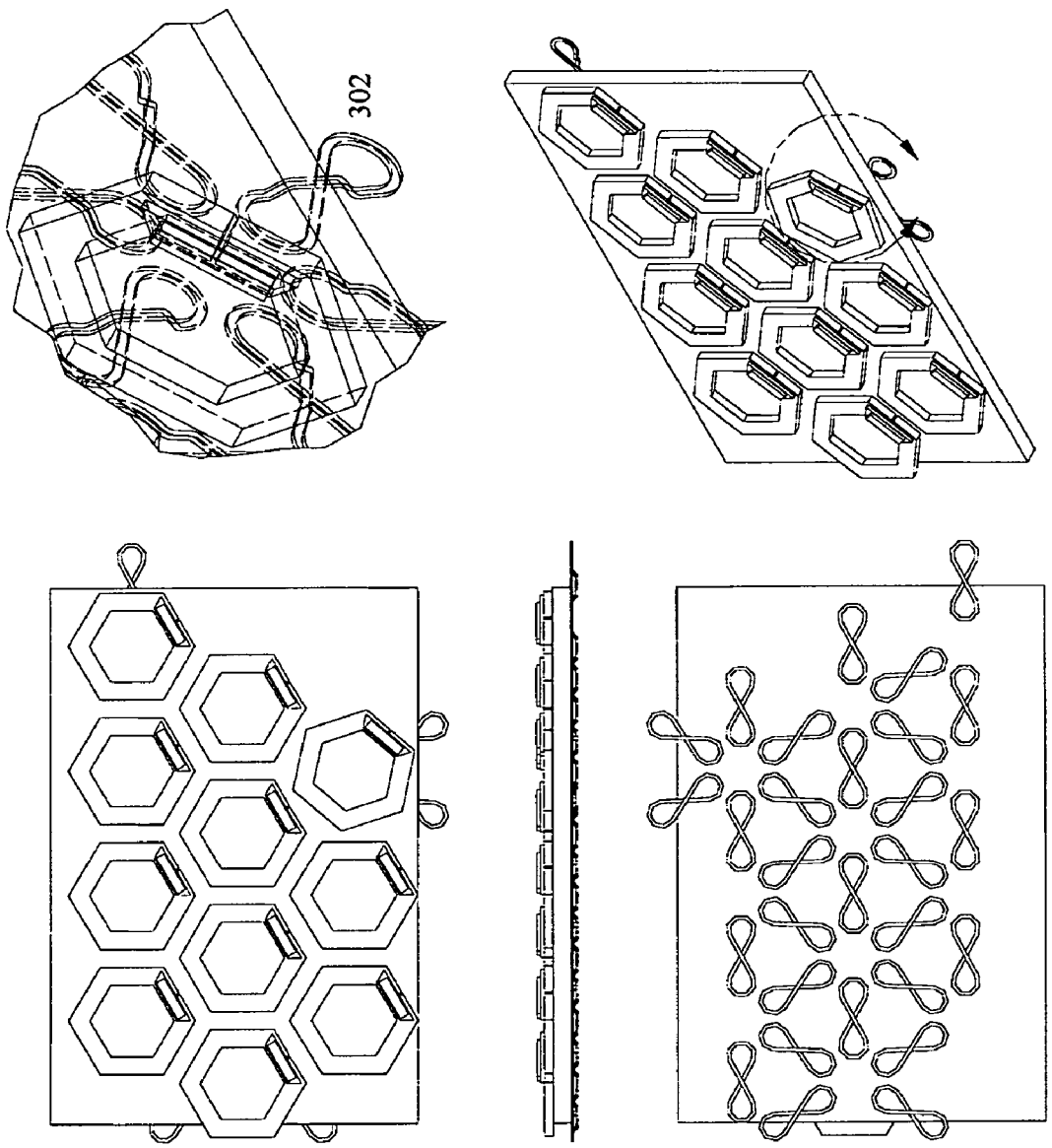
FIG. 20 shows design of the stage can be implemented in single as well as in multiple layers.
Figure 21:
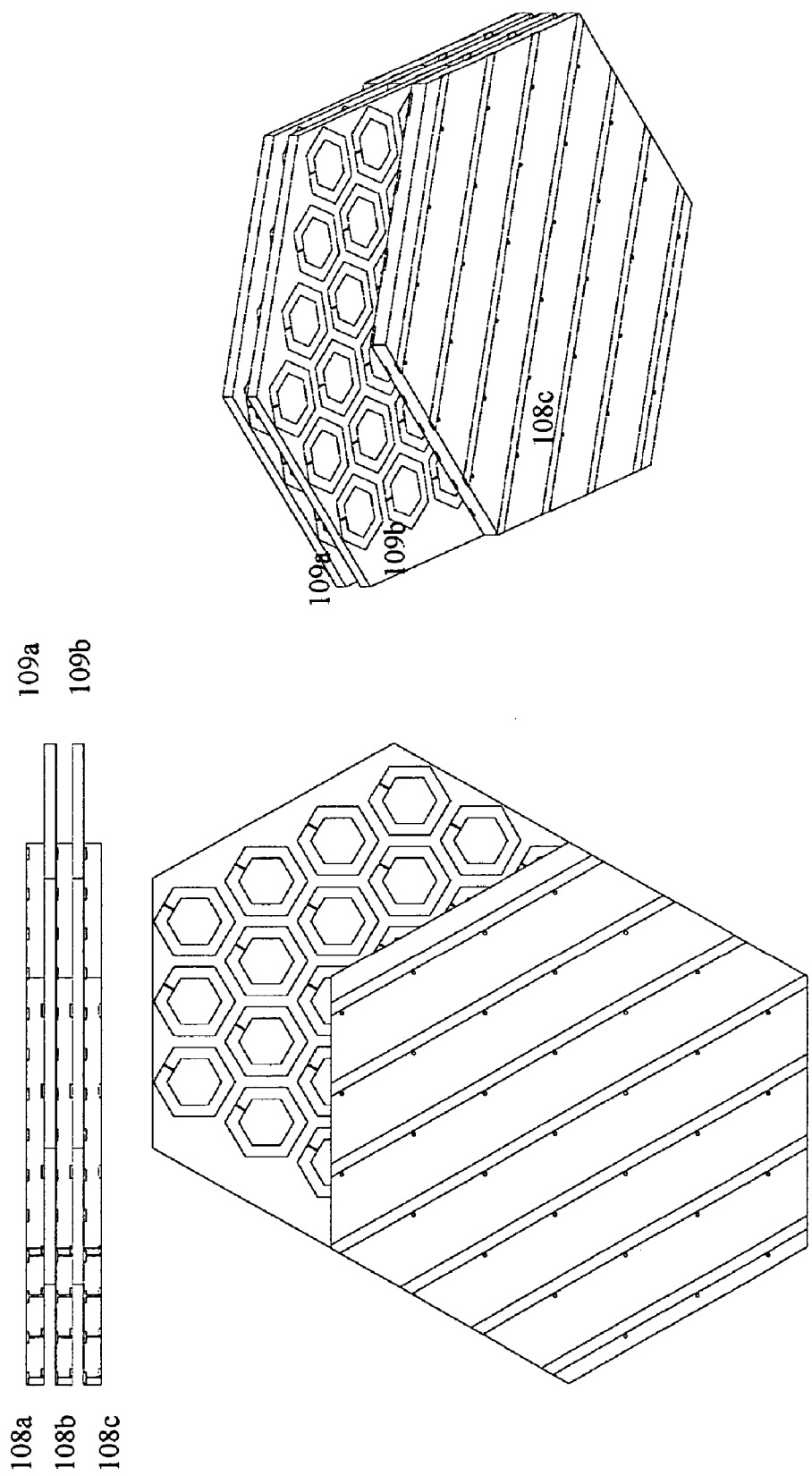
FIG. 21 shows multilayer stack assembly that has several base drives interlaces with stage coil assemblies.

The design of the stage can be implemented in single as well as in multiple layers. Example of such design is shown on FIG. 20. Coils are located on both sides of substrate layer. This figure demonstrates auxiliary coils 302 that reduce mutual inductance of adjacent resonant circuits of the stage. FIG. 21 shows multilayer stack assembly that has several base drives 108 (a–c) interlaces with stage coil assemblies 109 (a–b). Multilayer construction provides increased acceleration in apparatuses designed to handle massive payloads.

FIG. 22 shows electrical elements of the base drive assembly 108. Each coil element 200 on this drawing uses design 212. The coils are connected using layout show on FIG. 8.

Both stage and base coils and their electrical components can be manufactured using various types of standard lithographic techniques, which allow creation of coils element ranging in size from 100 nm to 0.1 m. This allows creation of the drive motors for various types of payload, travel ranges and accelerations.

Stage and base assemblies are retracted by means of magnetic levitation as well as gas bearing. When drive circuitry is engaged the stage and the base assemblies are experiencing significant repulsion. The action of the repulsion forces is constrained by geometry of the apparatus when it has shielded or multilayer design. In case of single base and single stage assembly this action is constrained by gravitational forces acting on the apparatus and payload as well as atmospheric or artificial gas pressure acting on liquid bearing or suction ports located on the base surface and counteracting the levitation force.

Yet another aspect of this invention is distributed thermal management apparatus integrated with the motor. Thermal management apparatus may include, but not limited to the following components: gas or liquid bearing; thermoelectric assemblies; mobile phase and transport channels; mini or/and MEMS valves; central and or distributed controller. Operation of these components described in detains in provisional patent applications U.S. 60/319,785 and U.S. 60/319,744. Advantage of integration of lithographically produces motor with micro fluidic thermo management system incorporating MEMS control elements and distributed microcontroller based control network is scalability, which allows creation of large planar motors capable of maintaining nanometer scale precision across all translation range.

Figure 23:
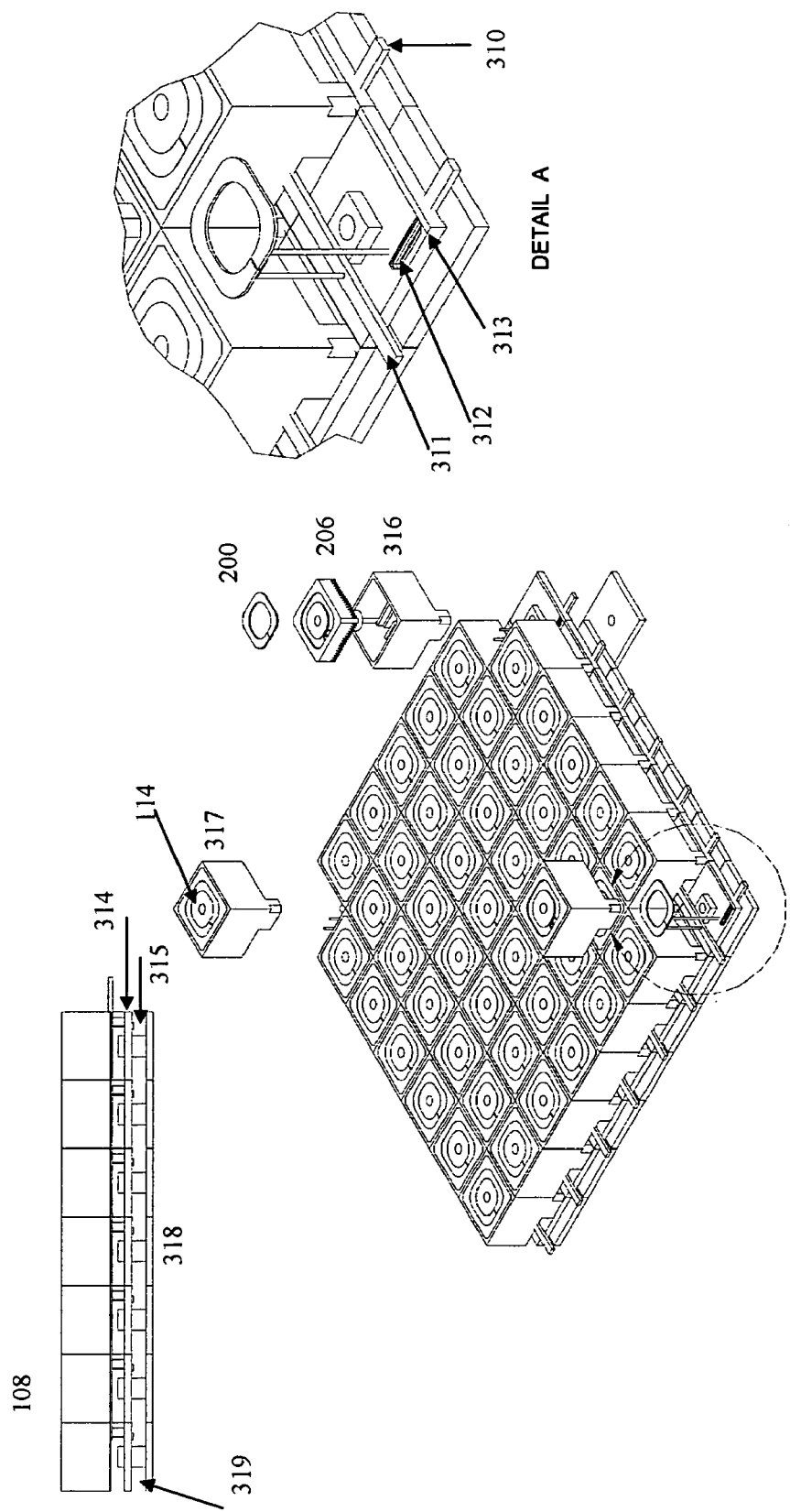
FIG. 23 shows design of thermo-magnetic shield.

FIG. 23 illustrates design of thermo-magnetic shield. Mobile base coil assembly 108 has inlet 315 and outlet 314 ports for mobile phase. Inlet port supplies refrigerated gas or fluid, which circulates through the assembly toward recirculation port 319. MEMS valves 312 controlled by thermal controller are connected to bus 313. These valves actuate flow of mobile phase through heat exchangers 316. Used mobile phase is returned through port 314. Ferromagnetic or conductive shield 206 minimizes mutual inductance of the coils 200 and operates as shield to reduce EM emission. These shield elements may be moved to significant distance form the coils to form just outer shield without effect on mutual inductance. Power to the coils is supplied by buses 311 and 310, which allow independent addressing in X and Y directions. These buses can be interconnected when used in motors with fixed number of electrical phases. As an example six phase motor have $1^{st}$ and $7^{th}$ buses linked, thus having only six different buses per each axes. Air bearing ports 114 are pressurized through port 318. Temperature of gas leaving ports 114 is controlled through the temperature of the coil assemblies 317. This design allows precise temperature control of the mobile stage while it moves along the base.

Figure 31:
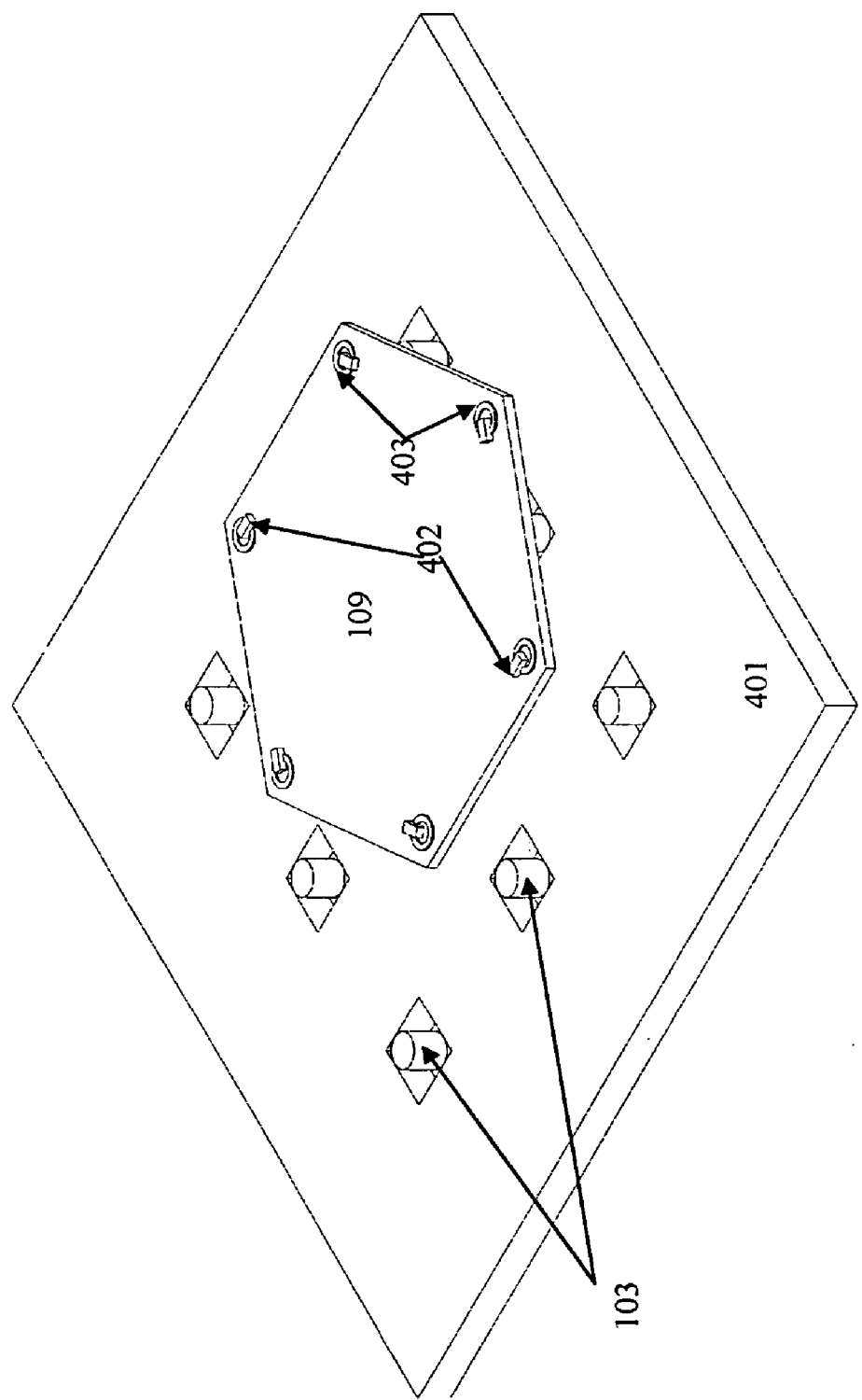
FIG. 31 shows plurality of steering coils that linked to microcontrollers, which make changes to electrical impedance of their circuits. This changes cause phase shift of induced currents and affect force produces by these coils, thus producing rotational moments.

Precision rotation control is yet another embodiment of this invention. Mobile stage component of the apparatus uses wireless link to receive control signals associated with required angle of rotation. Plurality of steering coils 403 are linked to microcontrollers, which make changes to electrical impedance of their circuits. This changes cause phase shift of induced currents and affect force produces by these coils, thus producing rotational moments. FIG. 31 shows schematic view that illustrates this invention. The steering coils 403 located along perimeter of the mobile stage 109. Wireless control signals are transmitted as IR or microwave and processed by microcontrollers 402. Mobile base 401 have cuts that host multiple position sensors. At any moment differential signal from at least two sensors provides data on rotational position of the mobile stage with respect to the base 101. Following embodiment describes construction of multi-beam position sensor that is capable of providing rotational data without use of additional sensors. As example the rotation precision of mobile stage with travel distance 138 mm that uses Absolute Position Sensor described below is within the range of $10^{-8}$.

Figure 32:
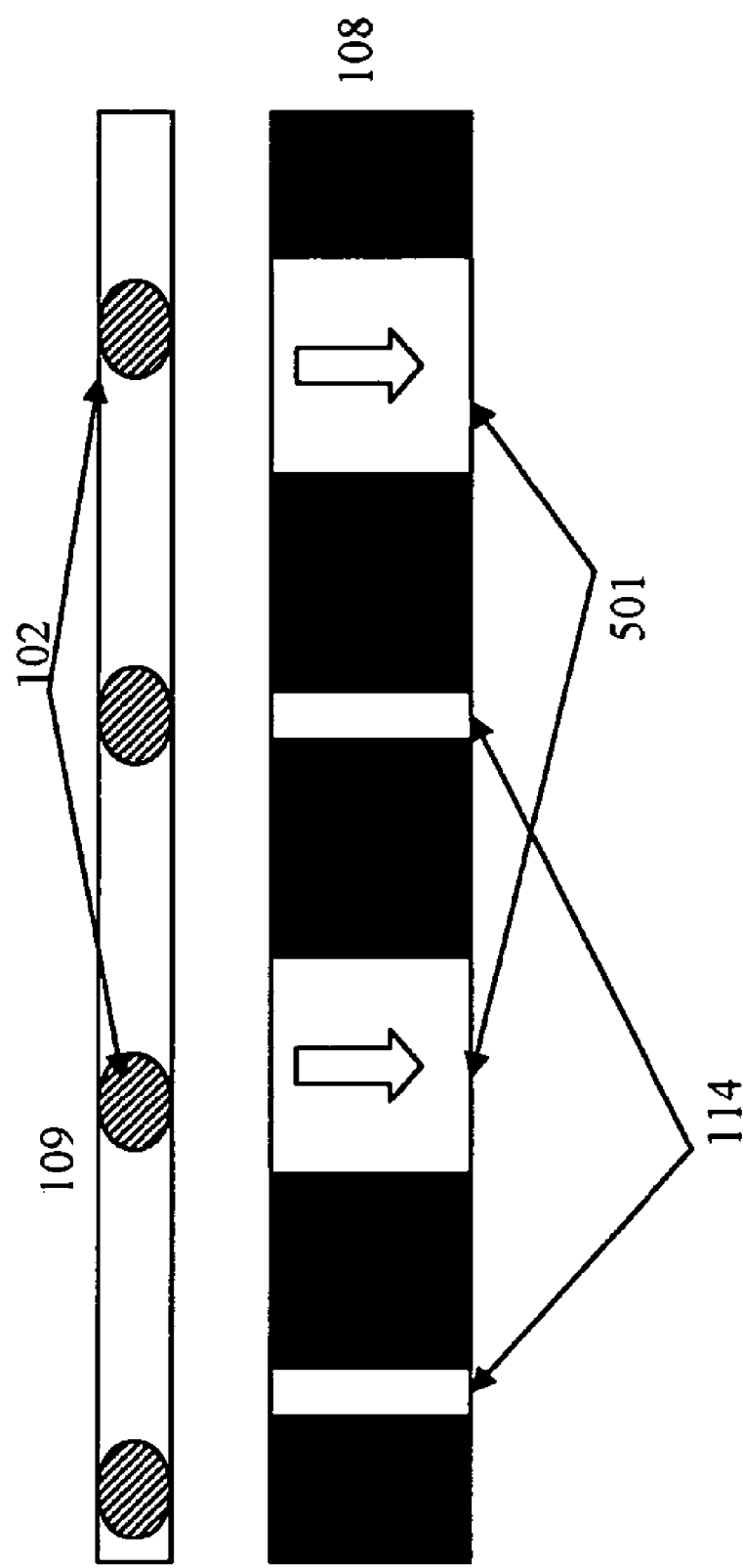
FIG. 32 shows elements of deceleration system.
Figure 33:
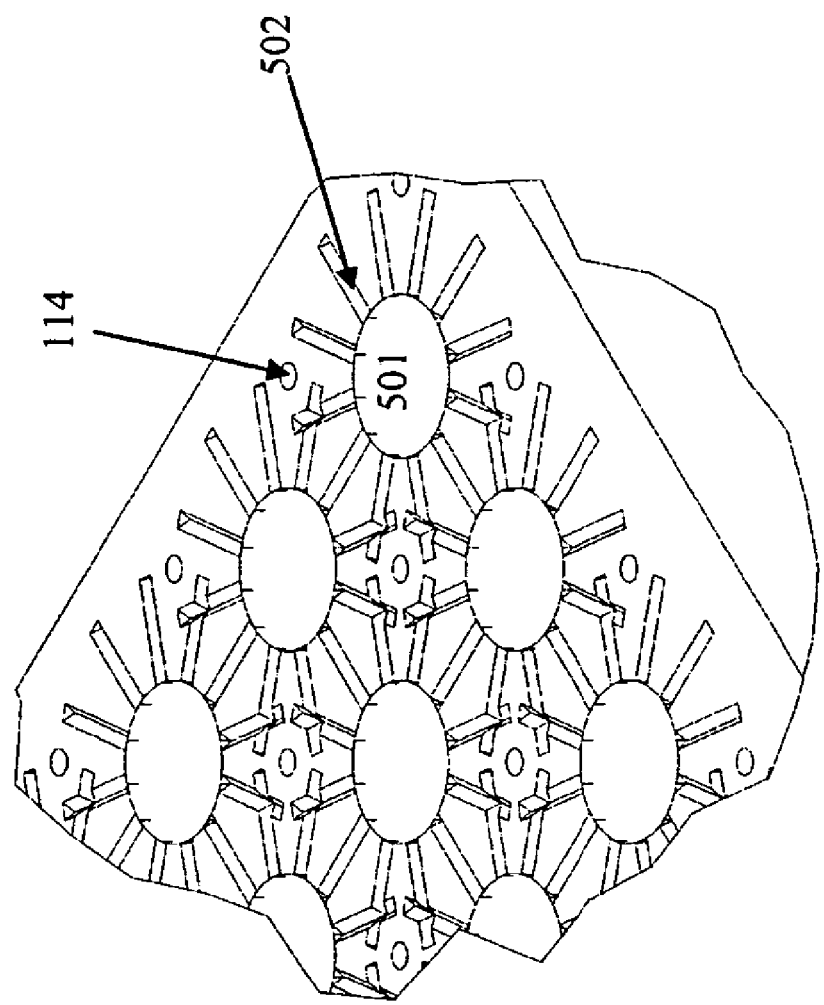
FIG. 33 shows surface of the planes that modifies to provide cavities for quick compression and or removal of inter plane gas or liquid.

Yet another aspect of this invention is extreme deceleration capabilities of the previously disclosed apparatus. It is provided through joint action of air bearing vacuum stabilizer and magnetic levitation. FIG. 32 illustrates principle of operation of this subsystem. Mobile stage while propelled experience significant levitation force normal to its plane, this force counteracts to ambient pressure acting due to vacuum suction applied through the surface ports 501. An example a mobile stage of size 300×300 mm experience atmospheric force 9 KN, levitation gap between the stage and the base is 5 micrometers, mass of the stage with payload is 100 g, landing time will be approximately 10 microseconds, friction coefficient of contacting planes assumed to be 0.1 and stage speed is 10 m/s, breaking acceleration will be 9000 m/s$^2$ and time to complete stop is approximately 1 ms. To achieve short landing time the surface of the planes is modifies to provide cavities for quick compression and or removal of inter plane gas or liquid. One of possible surface modifications 502 is illustrated on FIG. 33.

Yet another invention disclosed here is apparatus that perform functions of flexible motor. Construction of this apparatus has the same elements as previously described embodiments. Principle distinction is use of flexible substrates for manufacturing of mobile and base coil arrays. Apparatus also comprises liquid bearing or polymer liner to reduce friction between the mobile pieces. The apparatus can provide revolving rotational motion and or linear motion that can be in single or two dimensions.

Variety of implementations is possible as example: mobile stage can be implemented as flexible rod or pipe with coils exposed on it surface and base coil array can be implemented as pipe surrounding the mobile member, the central member can perform revolving motions and slide in/out motions at the same time, the whole assembly can be bent to any suitable shape. This example does not intend to limit the invention as it is obvious that many other shapes like stacks, belts, shits, etc. can be implemented as well. It is also obvious for one experienced in the art, that this invention can be used to provide periodic and or revolving motions. The shape of the mobile part can be arbitrarily selected, which includes any 2D planar shape, as well as non flat like cylinder, spherical segment and ellipsoid. Geometry of the static part must match selected geometry.

HIGH SPEED ABSOLUTE POSITION SENSOR

The invention discloses the method and apparatus for registration of absolute position of the stage with precision up to 0.2 nm enforceable over full range for motion of the mobile stage. The sensor registers both X, Y and rotation of the stage. The sensor is capable of reading exact current position of the stage without need to reset or recalibrate the stage position. The apparatus consists of spatially encoded grating, narrow band light source, at least one image detector, multi-way beam splitter, multiple spatial filters, multiple detector arrays, lenses, digital processing unit, and electrical components.

Figure 5:
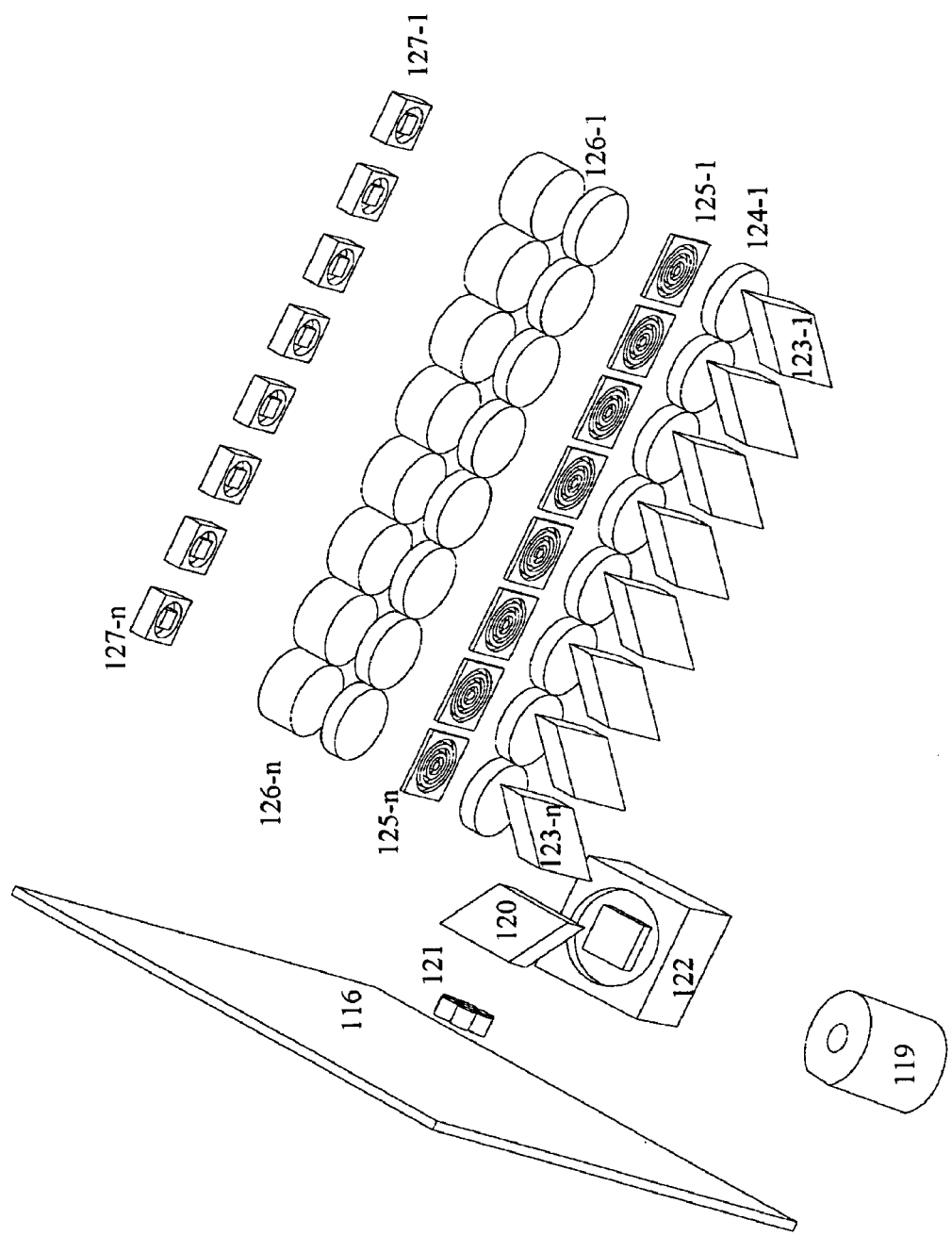
FIG. 5 shows the design of two-dimensional absolute position sensor.
Figure 24:
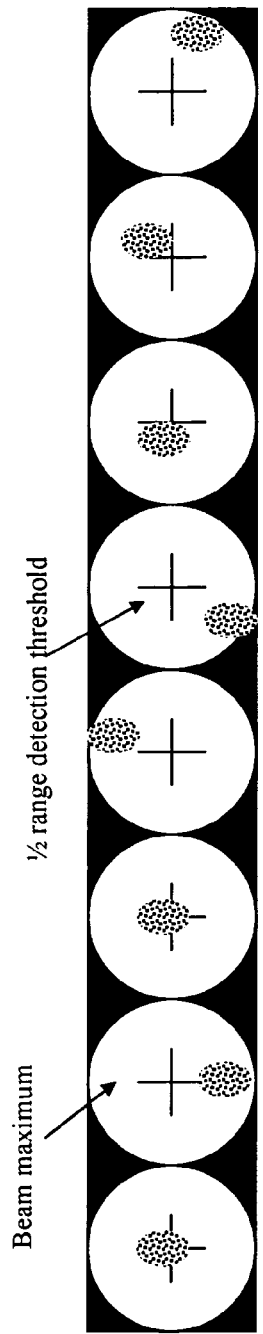
FIG. 24 shows the sampling procedure.

FIG. 5 shows the design of two-dimensional absolute position sensor. Laser light source 119 illuminates the spatially encoded grating 116 through the beam splitter 120 and planar array of objective lenses 121. Spatial separation of the array 121 corresponds to the period of identification pattern on the grating in such way that at any moment of tile at least one pattern lies completely inside field of view of one objective lens. Reflected beams array splits on beam splitter 120 and illuminates image detector 122 located in diffraction plane. Image detector reads at least one complete pattern. Digital processing unit decodes pattern ID and rotation. One beam from the array passes through multi-way beam splitter 123-n. This splitter directs beams to spatial filters 125-n, which are places in the diffraction planes. Each filters passes only $n^{th}$ diffraction order of primary spatial frequency of the grating. Optical elements 126-n have the filters and detectors 127-n in their focal planes. Detectors 127-n register location or binary presence of the light beam at the sensor area. This makes reading of the grating position extremely fast since there is no need for data processing. Array of ten analog detectors provides precision of $\frac{1}{3}^{10}$ of primary grating frequency. Use of K digital detectors with resolution N pixels provides the precision $1/N^K$ of primary spatial frequency of the grating. This provides precision 0.3 nm for grating with primary spatial frequency 20 um. FIG. 24 illustrates the sampling procedure. Shift of the stage for 20 um corresponds to full range of these readings.

Spatial encoding of the grating forms patterns similar to ones on FIG. 25. Each pattern contains X, or Y, or X&YX&Y identification number encoded in corresponding direction. Pattern with only one encoded ID have primary pattern encoded in direction of other axis. Identification number of each pattern is encoded using spatial coding method. ID with N bits is encoded as N distinguishable spatial frequencies. Pattern with two Ids X and Y is created as a product of two non-parallel patterns. The term "distinguishable frequencies" means, that there is at least one harmonic or modulation spatial frequency that can uniquely identify presence of encoded spatial frequency. Patterns can be positioned in any periodic way including but nor limited to square, rectangular, triangular, etc . . . As well X and Y axis can be selected with angle other than orthogonal, which allows encoding of additional information. Pattern size is constant. A special case for spatial encoding is circular pattern consisting only of concentric rings. There is no distinction between X and Y ID and both Ids are encoded into single ID with larger number of bits.

Example: stage travel distance is 138 mm; encoding schema uses code with 27 bars to encode 9 bits of information; selected S/N ratio of diffraction pattern is 20:1; resolution of the image detector 122 is 256×256 pixels. The size of the pattern is 27×10 um=270 um, with period 540 um, total number of encoded bits per axis is 9. First bit of the code can be used to provide primary pattern period as well as serve as parity check. To track shift of the pattern position beyond 20 um it requires three additional optical sensors 127-n, which makes it total 13.

Image detector 122 simultaneously reads tree diffraction patterns from lens array 121. One out of three diffraction patterns is guaranteed to be produced by complete code pattern, while others are produced by pattern's fragments. Depending on the encoding schema of the grating, Image detector 122 can be position in either diffraction or image plane on the optical path. Position in the image plane allows use of standard barcode type identification encoded on the grating. Position in the diffraction plane allows use of spatial encoding schemas which are disclosed in the next embodiment of this invention. Recognition and decoding of images takes significant time ranging from 0.1 ms to seconds. Advantage of diffraction plane decoding is extremely fast decoding and error checking, which are limited only by acquisition time of the image sensors and typically are less then 10 us.

ULTRA FAST BARCODE-LIKE SPATIAL ENCODING SCHEMA

This embodiment discloses the invention of new barcode-like single- or two-dimensional encoding of multi-bit information into images suitable for ultra fast and error-proof decoding. The invention covers three types of encoding, any of which allows ultra fast decoding regardless of the lateral position of the code. Single-dimensional encoding encodes information bits as X(K)=K*P+S, where X is position in single dimension of choice which is constrained to segment [0; N), where N is size of the code, and K is any natural number allowed by the constrain, and P is constant natural number represents period, and S is constant natural number represents offset and is constrained to [0; P). No two bits have identical P values. Each element of the code's image is drawn as solid bar of unit width in one of the N locations.

As an example code of size 10 with two encoded bits may have first bit encoded as stripes of unit size located at positions 0, 4, 8, and second bit encodes as stripes of unit size located at positions 3, 6, 9. First bit in this example has P=4 and S=0, second bit has P=3 and S=0. Parameters P and S for each encoded bit are selected in a way that allows fast recognition of their presence through diffraction pattern from the code's image. In the example above such detection can be done by measuring amplitudes of signal on diffraction using only binary values at only two fixed locations that represent spatial frequencies ⅓ and ¼. Such detection can be achieved by means of two photo detectors and for current state of semiconductor components development can easily provide decoding time on range of picoseconds, which is superior to decoding time of any existing barcode-like encoding.

Second type of invented encoding uses two dimensional coding that is purely a product of two single-dimensional codes rotated on some angle (0;90] degrees with respect to each other. Such encoding allows to double bit density over the same area, while providing the same decoding speed and error level. The code is constrained to parallelogram, and dimensions are determined by the angle and the sizes of encoding schemas along each axis.

Figure 26:
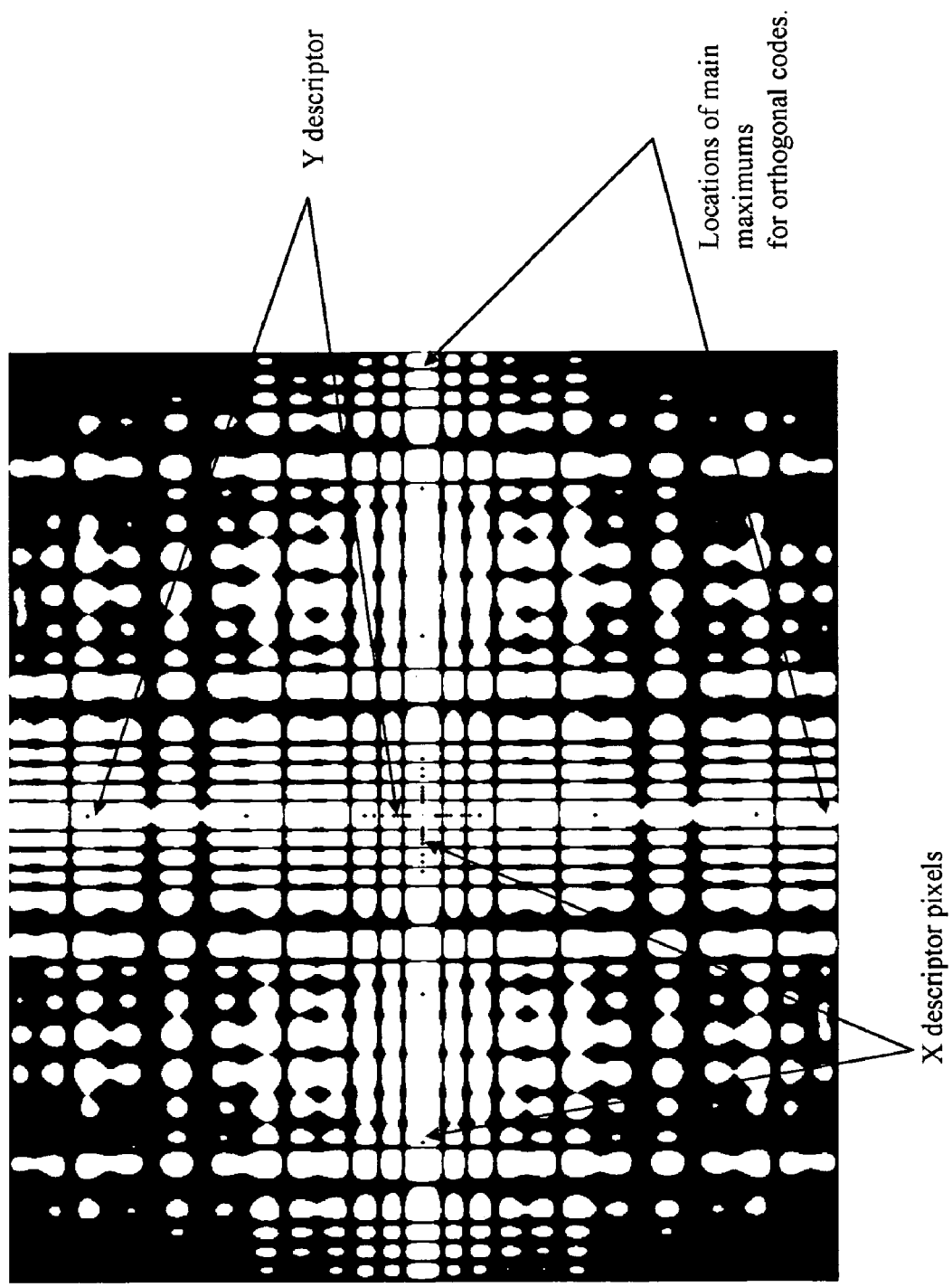
FIG. 26 shows an example of two-dimensional 18 bit encoding schema that has size of 27×27 pixels.
Figure 27:
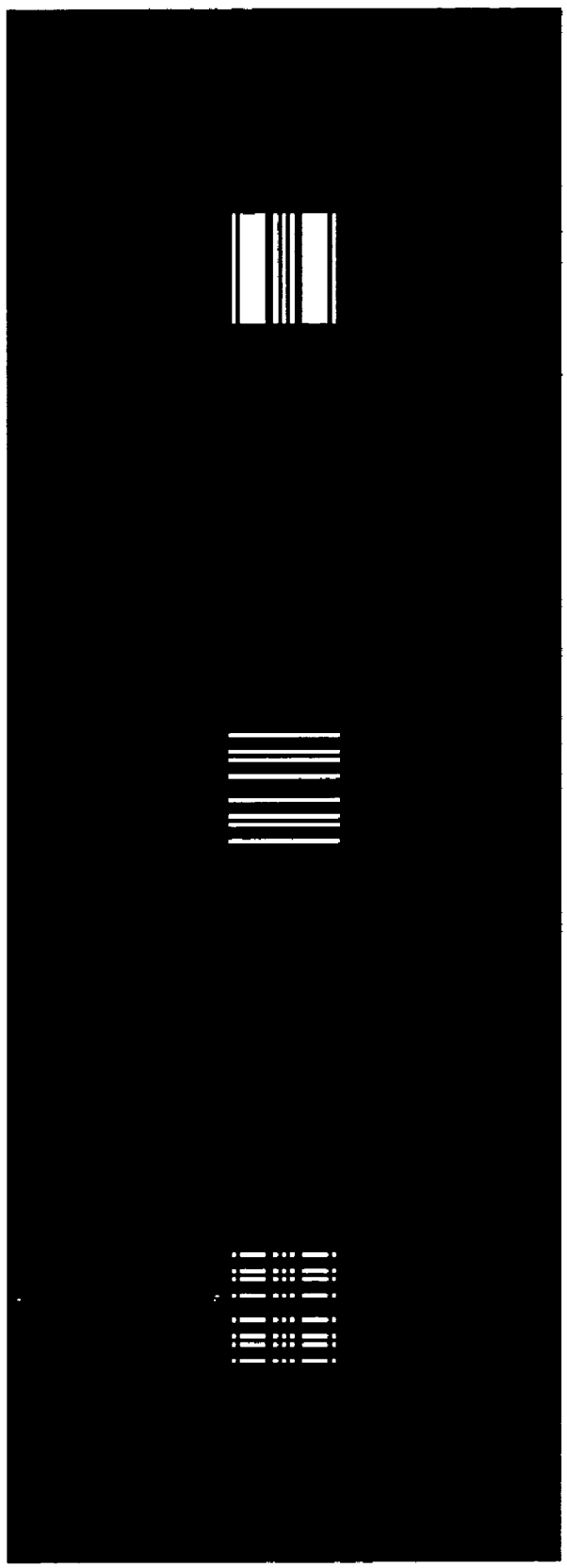
FIG. 27 shows two-dimensional code that uses this encoding to represent pair of numbers 145 and 378 in X and Y directions accordingly.

FIG. 26 shows an example of two-dimensional 18 bit encoding schema that has size of 27×27 pixels. For proper decoding it requires at least 9 detector located on X axis and 9 detectors located on Y axis. Encoding schema for each axis defined by collection of following pairs in {P;S} format:{26; 0}{24; 1}{22; 2}{16; 5}{14; 6}{10; 8}{9; 4}{6; 4}{4; 3}. FIG. 27 shows two-dimensional code that uses this encoding to represent pair of numbers 145 and 378 in X and Y directions accordingly. Two codes on the right shows this numbers encoded using single-dimensional codes with the same encoding schema.

Third type of the encoding uses collection of groups of concentric rings bound to a square of size N. The rings can be geometrical or can be a digitized approximation of a circular ring. Each ring group is defined through formula R(k)=k*P+S. This encoding schema uses algorithm identical to previous two. Each encoded bit corresponds to one group of concentric rings. Encoding density for this schema is less then for two previous schemas, but in cases when rotation of the code should be in consideration, it provides shortest decoding time.

In applications that frequently use rotation of the code's image, the method of decoding may have an additional steps. Due to symmetry of encoding schema described in the previous paragraph it is insensitive to rotations and thus requires only small number of photo sensors positioned at fixed locations. On the other hand first two schemas are sensitive to rotation and should compensate for it by either physical rotation of the detector, or by use of planar array of detectors and reading pixels corresponding to the angle of current rotation. Such array also provides a simple way of determining this angle by reading location of main maximum along the perimeter as it is shown on FIG. 26.

Figure 28:
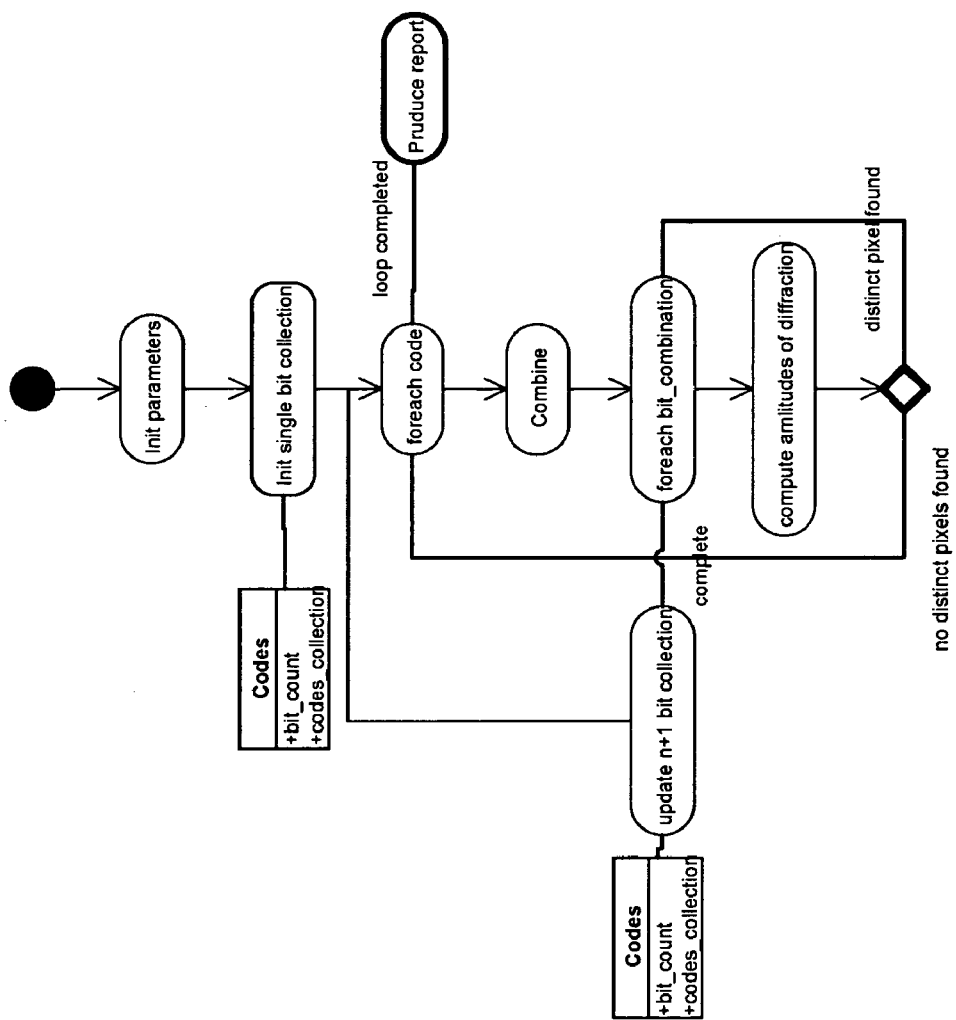
FIG. 28 shows an outline of mathematical algorithm for computing of such encoding schemas.

Encoding density, redundancy, error correction, and signal strength are defined by choice of appropriate encoding schema which is defined as code size and collection of {P;S} pairs with unique P values. FIG. 28 shows an outline of mathematical algorithm for computing of such encoding schemas. Input parameters for this algorithm are: minimal signal to noise ratio at points of detection; size of the code in pixels; minimal resolution of photo detector array in pixels. This algorithm is recursive and completes when search of all acceptable encoding schemas for specified input parameters is completed. Results of the computations are set of collections of encoding schemas grouped by number of encoded bits. The following table contains summary of such computations for selected encodings. All of them have a signal to noise contrast better than 20:1.

| Code size (pixels) | Detector resolution (pixels) | Maximum number of encoded bits | Count of discovered encodings | Encoding schemas {P; S} |
| --- | --- | --- | --- | --- |
| 9 | 128 | 4 | 1 | {8; 0}{4; 2}{3; 1}{2; 1} |
| 14 | 128 | 5 | 2 | [{13; 0}{11; 1}{7; 3}{5; 4}{3; 2}] [{13; 0}{11; 1}{9; 2}{7; 3}{5; 4}] |
| 18 | 128 | 6 | 1 | {17; 0}{13; 2}{11; 3}{7; 5}{5; 1}{3; 1} |
| 28 | 128 | 7 | 1 | {25; 1}{23; 2}{21; 3}{17; 5}{13; 7}{11; 8}{9; 0} |
| 21 | 256 | 8 | 1 | {20; 0}{16; 2}{14; 3}{12; 4}{10; 5}{9; 1}{8; 6}{6; 1} |
| 27 | 256 | 9 | 16 | [{24; 1}{20; 3}{13; 0}{12; 7}{11; 2}{10; 8}{8; 5}{7; 6}{6; 4}] [{24; 1 }{20; 3}{14; 6}{13; 0}{12; 7}{11; 2}{10; 8}{8; 5}{6; 4}] [{26; 0}{20; 3}{16; 5}{14; 6}{11; 2}{10; 8}{9; 4}{8; 1}{6; 1}] [{26; 0}{20; 3}{18; 4}{16; 5}{14; 6}{11; 2}{10; 8}{8; 1}{6; 1}] [{24; 1}{22; 2}{20; 3}{13; 0}{12; 7}{10; 8}{8; 5}{7; 6}{6; 4}] [{24; 1}{22; 2}{20; 3}{14; 6}{13; 0}{12; 7}{10; 8}{8; 5}{6; 4}] [{26; 0}{22; 2}{16; 5}{14; 6}{10; 8}{9; 4}{8; 1}{6; 4}{4; 3}] [{26; 0}{22; 2}{18; 4}{16; 5}{14; 6}{10; 8}{8; 1}{6; 1}{4; 3}] [{26; 0}{22; 2}{20; 3}{16; 5}{14; 6}{10; 8}{9; 4}{8; 1}{6; 1}] [{26; 0}{22; 2}{20; 3}{18; 4}{16; 5}{14; 6}{10; 8}{8; 1}{6; 1}] [{26; 0}{24; 1}{20; 3}{12; 7}{11; 2}{10; 8}{8; 5}{7; 6}{6; 4}] [{26; 0}{24; 1}{20; 3}{14; 6}{12; 7}{11; 2}{10; 8}{8; 5}{6; 4}] [{26; 0}{24; 1}{22; 2}{16; 5}{14; 6}{10; 8}{9; 4}{6; 4}{4; 3}] [{26; 0}{24; 1}{22; 2}{20; 3}{12; 7}{10; 8}{8; 5}{7; 6}{6; 4}] [{26; 0}{24; 1}{22; 2}{20; 3}{14; 6}{12; 7}{10; 8}{8; 5}{6; 4}] [{26; 0}{24; 1}{22; 2}{20; 3}{16; 5}{14; 6}{10; 8}{9; 4}{6; 4}] |
| 31 | 256 | 10 | 1 | {30; 0}{28; 1}{26; 2}{22; 4}{20; 5}{18; 6}{16; 7}{14; 8}{12; 9}{8; 3} |

-continued

| Code size (pixels) | Detector resolution (pixels) | Maximum number of encoded bits | Count of discovered encodings | Encoding schemas {P; S} |
|---|---|---|---|---|
| 35 | 256 | 11 | 2 | [{32; 1}{28; 3}{26; 4}{24; 5}<br>{22; 6}{20; 7}{18; 8}{17; 0}<br>{14; 10}{12; 11}{10; 2}]<br>[{34; 0}{32; 1}{28; 3}{26; 4}<br>{22; 6}{20; 7}{18; 8}{16; 9}<br>{15; 2}{14; 10}{12; 11}] |

Figure 29:
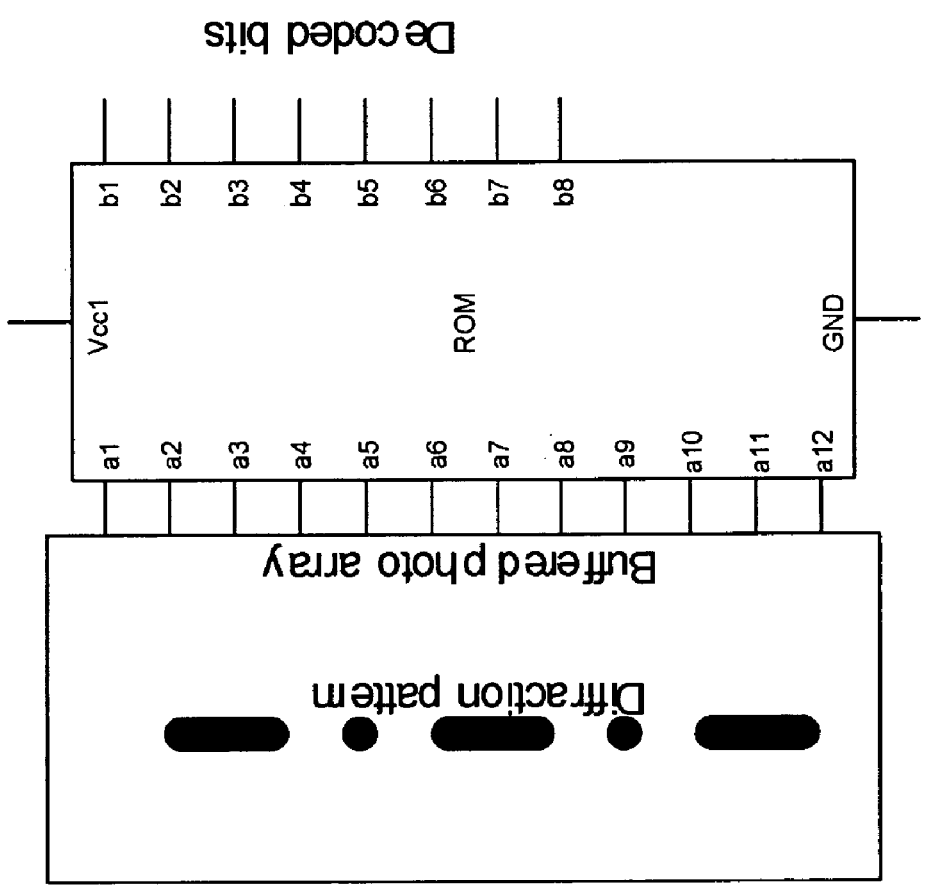
FIG. 29 shows possible schematic diagrams of decoding apparatus for rotation invariant encoding schema and or aligned codes.

FIG. 29 shows one of possible schematic diagrams of decoding apparatus for rotation invariant encoding schema and or aligned codes. Its key elements are array of photo detectors and decoding matrix. The array of photo detectors can be either custom made device where position of each photo element is preset according to selected encoding schema, or linear photo array with sufficient number of elements. Second solution may have inferior decoding speed, due to sequential access protocol, but as advantage it provides solution for self calibration. First solution has to be either precisely manufactured or be manually tuned. Decoding matrix may not be necessary with some encoding schemas, when one-to-one mapping exist between encoded bits and detector pixels. In general case this mapping is more complex and each encoded bit is represented as linear combination of detector pixels with binary coefficients. A simple solution like ROM chip can be used to decode such combinations into original bits. It provides one step decoding and does not limit decoding speed. Some encoding schemas have rank of decoding matrix exceeding number of encoded bits. Data from pixels of the detector thus have extra redundancy which can be used for fast error check. Apparatus that perform such operation compares decoded values using several different decoding matrixes. Physically such solution can be implemented using discrete components or single microprocessor chip.

Figure 30:
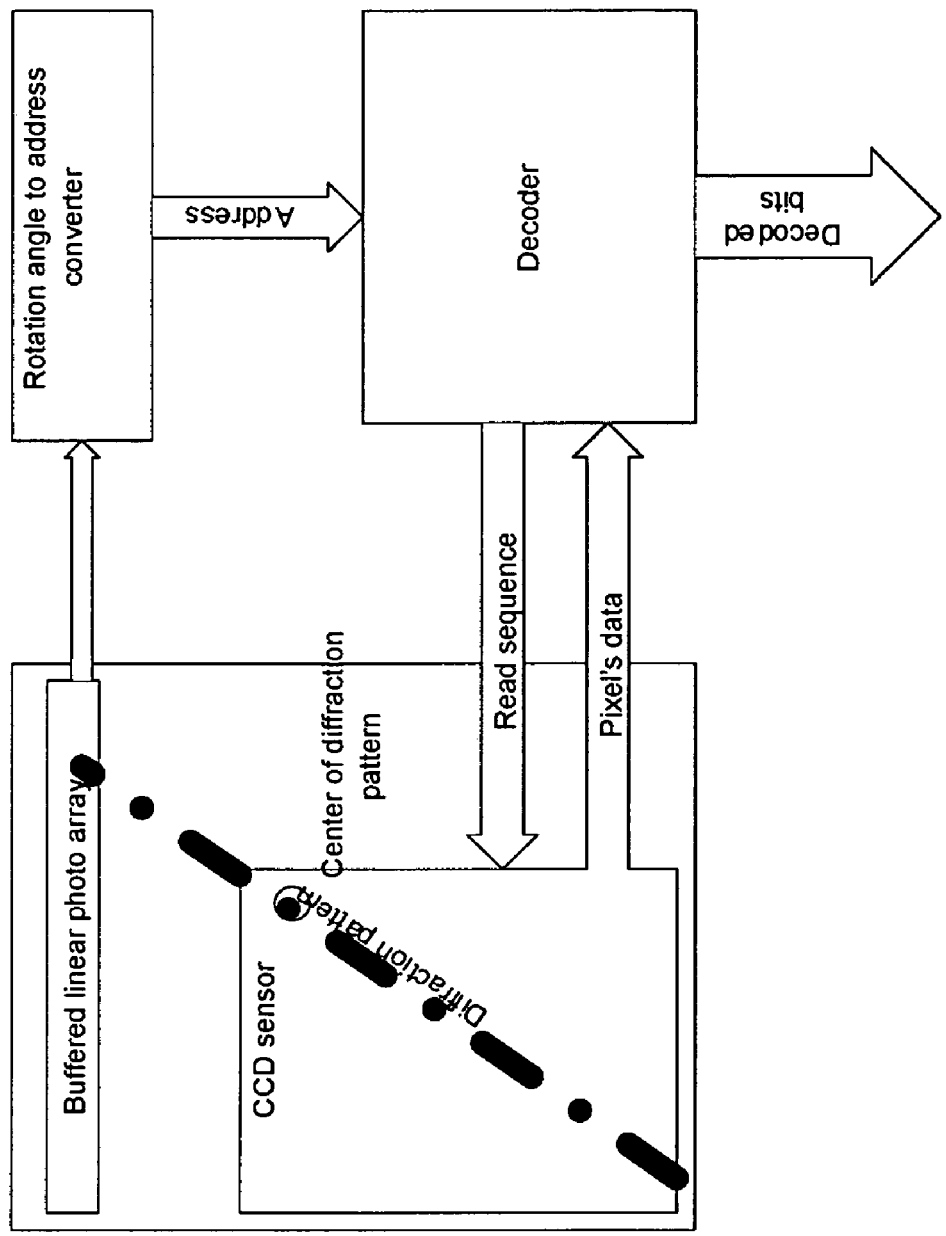
FIG. 30 shows of possible implementations of decoding apparatus capable of decoding rotated single and two-dimensional codes.

FIG. 30 shows one of possible implementations of decoding apparatus capable of decoding rotated single and two-dimensional codes. The image sensor contains at least one two-dimensional photo array (e.g. CCD chip) and optional linear or circular photo sensor or photo array. Fragment of diffraction pattern projected on the image sensor has maximum intensity along the line collinear with axis of the pattern as shown on FIG. 26. These data can be acquired from analysis of perimeter line of two-dimensional photo array or from optional photo sensor. Locations of descriptor pixels on two-dimensional photo array are determined by angle-to-address converter, which applies angular transform to addresses of decoding matrix. Implementation that uses array of discrete photo sensors (like CCD) this conversion can be implemented as a matrix of pre-computed addresses for each discrete position of the maximum. Speed of such implementation is only limited by access time of the CCD detector. Decoder component uses converted addresses of pixels to read the pixel".

The invention claimed is:

1. A positioning apparatus comprising a mobile member, a base member, and a plurality of drive motors formed by periodic array of elements of the mobile member and periodic array of elements of the base member, wherein base member serves as a source of magnetic field, and wherein number of constituent elements composing mobile member is equal or exceeds number of elements composing the base member, and the element of mobile member comprises electrically nonconductive peculiarities and conductive features, wherein the motor applies driving forces directly between the base member and the mobile member without any mechanical intermediary between those two, and to produce said force it does not utilize any permanent magnets or devices producing static magnetic fields, and which is also capable of producing non revolving motion of the mobile member, and wherein the driving force is produced by means of alternating electromagnetic field.

2. The apparatus of claim 1 producing multidimensional planar motions and comprising a base member, a mobile intermediate base member and a mobile stage member, where in the base member supports the intermediate mobile base, and the mobile stage is supported by the intermediate mobile base, and driving forces act between the stage and the mobile base and not between the base and the mobile base.

3. The apparatus claim 2 where a position of the mobile stage is monitored and or maintained and or governed with predefined precision, and motions and trajectories of the stage are digitally computed and controlled through a controller apparatus.

4. The apparatus of claim 3, where the controller apparatus uses standardized set of positioning commands to accept instructions from and or report results and status to external devices, and set of such commands is well known or newly developed and may include a subset or superset of Postscript, Windows Metafile, Enhanced Metafile, PCL, ASCII text, Graphical Device Interface GDI commands, TWAIN and Microsoft Windows Acquisition WIA commands, LabVIEW commands, TestPoint commands, or commands generated by any other software.

5. The apparatus of claim 1 that uses plurality of electric circuits comprising at least one magnetic coil and phase shifting elements that alter a phase of current oscillations from a phase of external alternating electro-magnetic field, and wherein the circuit's elements implemented as discrete or integral features of the mobile member.

6. The apparatus of claim 5 wherein said electric circuits have nearly identical resonance frequencies and said alternating electromagnetic field uses frequency close to said resonant frequency of the electric circuits of the mobile member or to one of its harmonics.

7. The apparatus of claim 1 comprising thermal management elements integrated with the base member, and where the thermal management elements are controlled by means of digital processor, and thermal management decisions are planned ahead using trajectory data.

8. An apparatus of claim 1 furthermore comprising a fast optical decoding device, wherein said device produces real-time data about absolute position of the mobile member with respect to the base member, and wherein said device retrieve the data using optical detector that reads said position encoded as optically recognizable pattern, wherein each element of the pattern has a shape of rectangle or ellipse and all main axes are parallel to each other, and all have identical dimensions in one direction, and centerlines of each element has coordinates that can be represented or defined by formula X(k)=k*P+S, where X is position in single dimension of choice which is constrained to segment [0: N), and where k is natural number and resulting position is constrained by predefined natural number N, and P and S are natural numbers, where P and S is a pair of numbers from predefined collection that satisfies signal to noise resolution of selected optical detector.

9. An apparatus of claim 8, wherein a resulted encoded pattern is a product of two said patterns rotated on some angle greater than zero degree and less than or equal ninety degree.

10. An apparatus of claim 1 furthermore comprising a fast optical decoding device, wherein said device produces real-time data about absolute position of the mobile member with respect to the base member, and wherein said device retrieve the data using optical detector that reads said position encoded as optically recognizable patterns wherein each element of the pattern has shape of concentric ring or elliptic ring, and all rings have identical thickness, and relationships between radiuses of the rings can be represents or defined by formula R(k)=k*P+S, where R is constrained to segment [0: N), where k is natural number and resulting radiuses are constrained by predefined natural number N, and P and S are natural numbers, where P and S is a pair of numbers from predefined collection, and the collection can be obtained by means of computations to satisfy signal to noise resolution of selected optical detector.

11. An apparatus of claim 1 furthermore comprising a fast optical decoding device, wherein said device comprises a linear multi-pixel integral optical sensor and a memory matrix, where in the memory matrix performs one step translation of diffraction amplitudes into decoded information.

12. The apparatus of claim 1 or claim 2 where position of the mobile member in the direction normal to the motion is constrained by means of external gas pressure, wherein the pressure source is artificial or atmospheric and acts against liquid bearing or gas bearing with or without suction ports with lower pressure.

13. The .apparatus of claim 12 further comprising thermal management elements integrated with it, and where the thermal management of the mobile members of the apparatus is achieved by means of the same thermal management elements acting through bearing gaps between those components, and uses gas media of the gas bearing or liquid media of the liquid bearing as a primary heat transfer intermediary.

14. The apparatus of claim 1 or claim 2 that comprise a randomly addressable array of electromagnetic coils or other elements capable of generating magnetic field to produce said alternating electromagnetic field, wherein said elements may be coupled with other electrical elements both discrete and integral, and coil elements can be implemented as a loop, multiple loops, non loop wire of straight or other shape, and may use components made of materials with ferromagnetic properties.

15. The apparatus of claim 1 or claim 2 where the magnetic field is specially shaped by means of ferromagnetic and or diamagnetic materials arranged in a plane nearly parallel to the direction of motion, or along non-planar surface defined by a trajectory of the motion, wherein the magnetic field is shaped to produce maximum tangential gradient of magnetic field intensity component that orthogonal to the trajectory.

16. The apparatus of claim 1 or claim 2 that contain an array of electromagnetic coils or other inductive elements or other sources of magnetic field that are manufactured as a single integral component, and selected manufacturing process uses a mask or a print during technological steps of production of elements of the array.

17. The apparatus of claim 16 that comprises mobile member composed of stack of layers of coil arrays or arrays of other inductive components that interlaced with stack of layers of components comprising the base member.

18. A positioning apparatus of claims 1 or 2 that provides periodic or revolving motion of the mobile member and wherein mobile member is shaped as a disk or as a cylinder or as an ellipsoid.

19. The apparatus of claim 1 or 2, wherein said mobile members and base members provide high acceleration motions of its payload in a physically constrained space, wherein the accelerations exceed 100 m/sec2, and wherein deceleration of the payload is assisted by mechanical friction, and the friction force is dynamically actuated for the same goal.

20. The apparatus of claim 19 furthermore comprising narrow planar gap between parts participating in frictional interaction, and the gap plane is parallel to the directions of motions and the gap height is less that 10 micrometers, and at least one of the surfaces forming the gap has channels and or cavities and or other surface and or volume features that provide means for compression or temporary storage and or removal of media occupying the volume of the gap, where in the media is a gas or a liquid.

21. A fast optical decoding device of claim 8 or 10 or 9, wherein said device measures light intensity of diffraction pattern at small number of predefined locations, and wherein the diffraction pattern is obtained by illumination of the optical encoding with narrowband light source.

22. A fast optical decoding device of claims 8 or 10 or 9, furthermore comprising an array of discrete photo detectors and a memory matrix, where in the detectors are positioned in predefined locations and register intensity of light on diffraction pattern, and the memory matrix performs one step translation of diffraction amplitudes into decoded information.

23. A fast optical decoding device of claims 8 or 10 or 9, furthermore comprising an optical sensor, rotation converter and one step decoder, wherein the optical sensor is two dimensional photo detector with optional linear photo detector, and the rotation converter is digital device that translates location of amplitude maximum into predefined set of two dimensional coordinates, and the decoder comprises memory matrix and performs one step decoding of encoded information.

24. A fast optical decoding device of claims 8 or 10 or 9, wherein said device contains spatially encoded grating, and light source, and array of spatial filters, and array of photo detectors, and the light source produces a single or multiple narrowband beams.

25. A position sensor apparatus fast optical decoding device of claims 8 or 10 or 9 that utilizes single CCD device or other integral two dimensional photo detector for imaging of several diffraction patterns obtained from several distinct locations.

26. A flexible apparatus acting as a positioning device and or as a motor and comprising mobile member and base member and utilizing magnetic forces to apply driving force directly to mobile member without any mechanical intermediary and where the base member comprises an array of electrical conductors producing magnetic field with dominant direction normal to the direction of produced motion, and magnitude of the field changes in time throughout the array, wherein the mobile member comprises an array of electrical circuits which are capable of creating induced magnetic field or contain superconducting materials or flexible multi-pole permanent magnets.

27. The apparatus of claim 26 that is solidified to maintain constant shape over the period of its intended use.

* * * * *